US012811726B2

(12) United States Patent
Lee et al.

(10) Patent No.: US 12,811,726 B2
(45) Date of Patent: Nov. 24, 2026

(54) METHOD AND DEVICE FOR PERFORMING RETRANSMISSION IN WIRELESS COMMUNICATION SYSTEM

(71) Applicant: LG ELECTRONICS INC., Seoul (KR)

(72) Inventors: Jong Ku Lee, Seoul (KR); Dong Sun Lee, Seoul (KR); Sunam Kim, Seoul (KR); Sung Ryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 382 days.

(21) Appl. No.: 18/571,464

(22) PCT Filed: Jul. 9, 2021

(86) PCT No.: PCT/KR2021/008838
§ 371 (c)(1),
(2) Date: Dec. 18, 2023

(87) PCT Pub. No.: WO2023/282373
PCT Pub. Date: Jan. 12, 2023

(65) Prior Publication Data
US 2024/0283572 A1 Aug. 22, 2024

(51) Int. Cl.
*H04L 1/1812* (2023.01)
*H04L 5/00* (2006.01)
*H04W 72/232* (2023.01)

(52) U.S. Cl.
CPC .......... *H04L 1/1812* (2013.01); *H04L 5/0055* (2013.01); *H04W 72/232* (2023.01)

(58) Field of Classification Search
CPC ... H04W 72/1263; H04W 72/23; H04W 4/70; H04W 72/12; H04W 72/535;
(Continued)

(56) References Cited

U.S. PATENT DOCUMENTS

2016/0056926 A1* 2/2016 Li .......................... H04L 1/1822 370/280
2019/0261333 A1 8/2019 Dinan et al.
(Continued)

FOREIGN PATENT DOCUMENTS

| | | |
|---|---|---|
| KR | 10-2017-0134238 | 12/2017 |
| WO | 2014-171754 | 10/2014 |
| WO | 2021-050735 | 3/2021 |

OTHER PUBLICATIONS

PCT International Application No. PCT/KR2021/008838, International Search Report dated Apr. 7, 2022, 4 pages.
(Continued)

*Primary Examiner* — Romani Ohri
(74) *Attorney, Agent, or Firm* — LEE, HONG, DEGERMAN, KANG & WAIMEY

(57) ABSTRACT

A method for operating a base station, according to the present disclosure, for performing retransmission in a wireless communication system, comprises the steps of: transmitting a first downlink control signal (DCI); and transmitting a first type transport block and a second type transport block through resources within a first transmission time interval (TTI) indicated by the first DCI, wherein the first DCI may comprise at least one of a first hybrid automatic repeat request (HARQ) process number, a first new data indicator (NDI), and a first redundancy version (RV) for the first type transport block, and the first type transport block may comprise at least one of a second HARQ process number, a second NDI, and a second RV for the second type transport block.

7 Claims, 28 Drawing Sheets

(58) Field of Classification Search
CPC ..... H04L 1/1812; H04L 1/1819; H04L 1/182; H04L 1/1864; H04L 1/1896; H04L 5/0048; H04L 5/0053
See application file for complete search history.

(56) References Cited

U.S. PATENT DOCUMENTS

| | | | | |
|---|---|---|---|---|
| 2019/0312706 | A1* | 10/2019 | Nammi | H04L 1/0025 |
| 2020/0145964 | A1* | 5/2020 | Sengupta | H04L 1/0031 |
| 2020/0228296 | A1* | 7/2020 | Su | H04W 72/04 |
| 2021/0167897 | A1* | 6/2021 | Seidel | H04L 1/1816 |

OTHER PUBLICATIONS

5G; NR; Physical layer procedures for data (3GPP TS 38.214 version 15.2.0 Release 15), ETSI TS 138 214 V15.2.0., Jul. 2018, 96 pages.

* cited by examiner

METHOD AND DEVICE FOR PERFORMING RETRANSMISSION IN WIRELESS COMMUNICATION SYSTEM

CROSS-REFERENCE TO RELATED APPLICATION(S)

This application is the National Stage filing under 35 U.S.C. 371 of International Application No. PCT/KR2021/008838, filed on Jul. 9, 2021, the contents of which is hereby incorporated by reference herein in its entirety.

TECHNICAL FIELD

The present disclosure relates to a wireless communication system, and more particularly, to a method and device for performing retransmission in a wireless communication system.

BACKGROUND

Radio access systems have come into widespread in order to provide various types of communication services such as voice or data. In general, a radio access system is a multiple access system capable of supporting communication with multiple users by sharing available system resources (bandwidth, transmit power, etc.). Examples of the multiple access system include a code division multiple access (CDMA) system, a frequency division multiple access (FDMA) system, a time division multiple access (TDMA) system, a single carrier-frequency division multiple access (SC-FDMA) system, etc.

In particular, as many communication apparatuses require a large communication capacity, an enhanced mobile broadband (eMBB) communication technology has been proposed compared to radio access technology (RAT). In addition, not only massive machine type communications (MTC) for providing various services anytime anywhere by connecting a plurality of apparatuses and things but also communication systems considering services/user equipments (UEs) sensitive to reliability and latency have been proposed. To this end, various technical configurations have been proposed.

SUMMARY

The present disclosure may provide a device and method for effectively performing retransmission in a wireless communication system.

The present disclosure may provide a device and method for effectively transmitting multiple quality of service (QoS) data in a wireless communication system.

The present disclosure relates to a device and method for transmitting information associated with retransmission of another transport block (TB) through a TB in a wireless communication system.

The present disclosure relates to a device and method for managing information associated with retransmission of TBs hierarchically designed in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method performed by a base station in wireless communication system includes transmitting a first downlink control signal (DCI) and transmitting a first type transport block and a second type transport block through a resource within a first transmission time interval (TTI) indicated by the first DCI, and the first DCI may include at least one of a first hybrid automatic repeat request (HARQ) process number, a first new data indicator (NDI), and a first redundancy version (RV) for the first type transport block, and the first type transport block may include at least one of a second HARQ process number, a second NDI, and a second RV for the second type transport block.

As an example of the present disclosure, a method performed by a terminal in wireless communication system includes receiving a first downlink control signal (DCI) and receiving a first type transport block and a second type transport block through a resource within a first transmission time interval (TTI) indicated by the first DCI, and the first DCI may include at least one of a first hybrid automatic repeat request (HARQ) process number, a first new data indicator (NDI), and a first redundancy version (RV) for the first type transport block, and the first type transport block may include at least one of a second HARQ process number, a second NDI, and a second RV for the second type transport block.

As an example of the present disclosure, a base station in a wireless communication system includes a transceiver and a processor coupled with the transceiver. The processor may be configured to transmit a first downlink control signal (DCI) and to transmit a first type transport block and a second type transport block through a resource within a first transmission time interval (TTI) indicated by the first DCI, and the first DCI may include at least one of a first hybrid automatic repeat request (HARQ) process number, a first new data indicator (NDI), and a first redundancy version (RV) for the first type transport block, and the first type transport block may include at least one of a second HARQ process number, a second NDI, and a second RV for the second type transport block.

As an example of the present disclosure, a terminal in a wireless communication system includes a transceiver and a processor coupled with the transceiver. The processor may be configured to receive a first downlink control signal (DCI) and to receive a first type transport block and a second type transport block through a resource within a first transmission time interval (TTI) indicated by the first DCI, and the first DCI may include at least one of a first hybrid automatic repeat request (HARQ) process number, a first new data indicator (NDI), and a first redundancy version (RV) for the first type transport block, and the first type transport block may include at least one of a second HARQ process number, a second NDI, and a second RV for the second type transport block.

As an example of the present disclosure, a communication device includes at least one processor and at least one computer memory storing an instruction indicating operations when executed by the at least one processor, and the operations may include receiving a first downlink control signal (DCI) and receiving a first type transport block and a second type transport block through a resource within a first transmission time interval (TTI) indicated by the first DCI, and the first DCI may include at least one of a first hybrid automatic repeat request (HARQ) process number, a first new data indicator (NDI), and a first redundancy version (RV) for the first type transport block, and the first type transport block may include at least one of a second HARQ process number, a second NDI, and a second RV for the second type transport block.

As an example of the present disclosure, a non-transitory computer-readable medium storing at least one instruction, which includes the at least one instruction executable by a processor, and the at least one instruction may control a device to receive a first downlink control signal (DCI) and to receive a first type transport block and a second type transport block through a resource within a first transmission time interval (TTI) indicated by the first DCI, and the first DCI may include at least one of a first hybrid automatic repeat request (HARQ) process number, a first new data indicator (NDI), and a first redundancy version (RV) for the first type transport block, and the first type transport block may include at least one of a second HARQ process number, a second NDI, and a second RV for the second type transport block.

The above-described aspects of the present disclosure are merely some of the preferred embodiments of the present disclosure, and various embodiments reflecting the technical features of the present disclosure may be derived and understood by those of ordinary skill in the art based on the following detailed description of the disclosure.

As is apparent from the above description, the embodiments of the present disclosure have the following effects.

According to the present disclosure, retransmission of transport blocks that are hierarchically designed may be performed effectively.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings are provided to help understanding of the present disclosure, and may provide embodiments of the present disclosure together with a detailed description. However, the technical features of the present disclosure are not limited to specific drawings, and the features disclosed in each drawing may be combined with each other to constitute a new embodiment. Reference numerals in each drawing may refer to structural elements.

DETAILED DESCRIPTION

Figure 1:
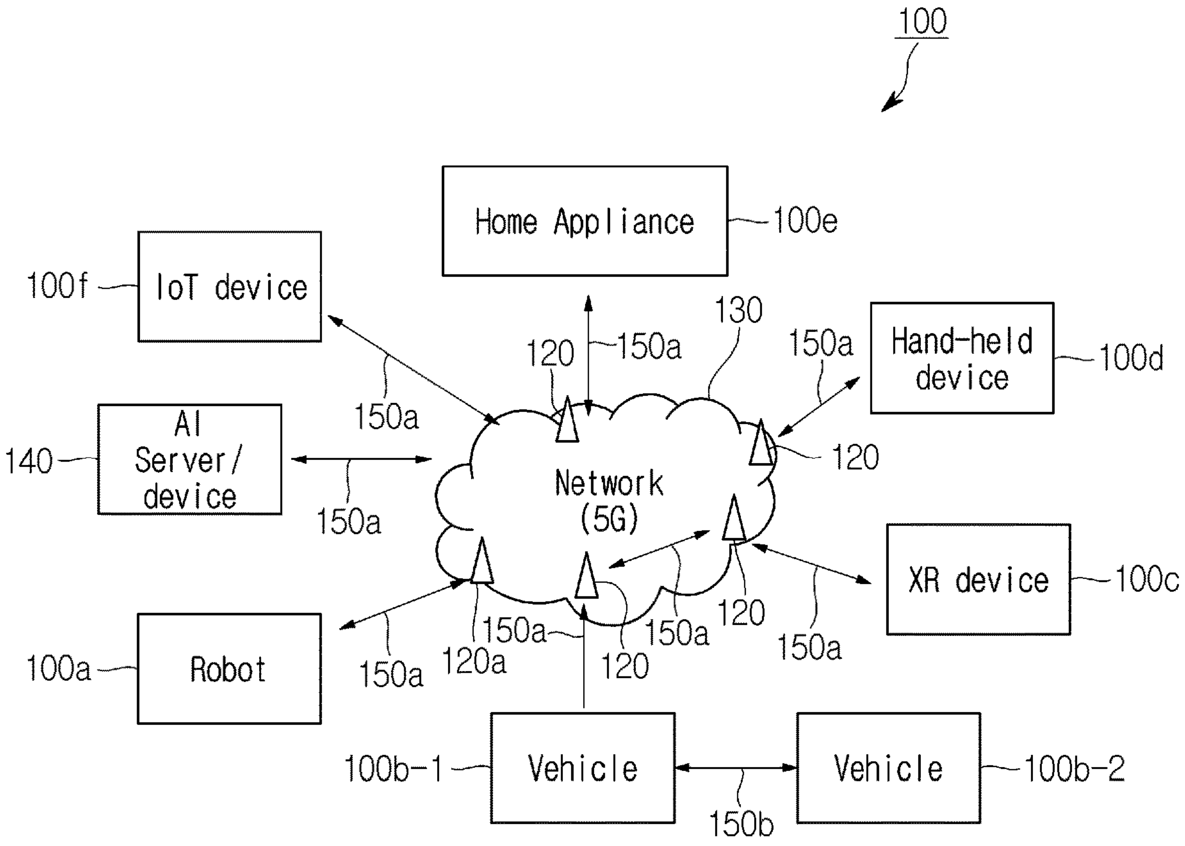
FIG. 1 illustrates an example of a communication system applicable to the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a mobile station. A BS refers to a terminal node of a network, which directly communicates with a mobile station. A specific operation described as being performed by the BS may be performed by an upper node of the BS.

Namely, it is apparent that, in a network comprised of a plurality of network nodes including a BS, various operations performed for communication with a mobile station may be performed by the BS, or network nodes other than the BS. The term "BS" may be replaced with a fixed station, a Node B, an evolved Node B (eNode B or eNB), an advanced base station (ABS), an access point, etc.

In the embodiments of the present disclosure, the term terminal may be replaced with a UE, a mobile station (MS), a subscriber station (SS), a mobile subscriber station (MSS), a mobile terminal, an advanced mobile station (AMS), etc.

A transmitter is a fixed and/or mobile node that provides a data service or a voice service and a receiver is a fixed and/or mobile node that receives a data service or a voice service. Therefore, a mobile station may serve as a transmitter and a BS may serve as a receiver, on an uplink (UL). Likewise, the mobile station may serve as a receiver and the BS may serve as a transmitter, on a downlink (DL).

The embodiments of the present disclosure may be supported by standard specifications disclosed for at least one of wireless access systems including an Institute of Electrical and Electronics Engineers (IEEE) 802.xx system, a 3$^{rd}$ Generation Partnership Project (3GPP) system, a 3GPP Long Term Evolution (LTE) system, 3GPP 5$^{th}$ generation (5G) new radio (NR) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331.

In addition, the embodiments of the present disclosure are applicable to other radio access systems and are not limited to the above-described system. For example, the embodiments of the present disclosure are applicable to systems applied after a 3GPP 5G NR system and are not limited to a specific system.

That is, steps or parts that are not described to clarify the technical features of the present disclosure may be supported by those documents. Further, all terms as set forth herein may be explained by the standard documents.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various radio access systems such as code division multiple access (CDMA), frequency division multiple access (FDMA), time division multiple access (TDMA), orthogonal frequency division multiple access (OFDMA), single carrier frequency division multiple access (SC-FDMA), etc.

Hereinafter, in order to clarify the following description, a description is made based on a 3GPP communication system (e.g., LTE, NR, etc.), but the technical spirit of the present disclosure is not limited thereto. LTE may refer to technology after 3GPP TS 36.xxx Release 8. In detail, LTE technology after 3GPP TS 36.xxx Release 10 may be referred to as LTE-A, and LTE technology after 3GPP TS 36.xxx Release 13 may be referred to as LTE-A pro. 3GPP NR may refer to technology after TS 38.xxx Release 15. 3GPP 6G may refer to technology TS Release 17 and/or Release 18. "xxx" may refer to a detailed number of a standard document. LTE/NR/6G may be collectively referred to as a 3GPP system.

For background arts, terms, abbreviations, etc. used in the present disclosure, refer to matters described in the standard documents published prior to the present disclosure. For example, reference may be made to the standard documents 36.xxx and 38.xxx.

Communication System Applicable to the Present Disclosure

Without being limited thereto, various descriptions, functions, procedures, proposals, methods and/or operational flowcharts of the present disclosure disclosed herein are applicable to various fields requiring wireless communication/connection (e.g., 5G).

Hereinafter, a more detailed description will be given with reference to the drawings. In the following drawings/description, the same reference numerals may exemplify the same or corresponding hardware blocks, software blocks or functional blocks unless indicated otherwise.

FIG. 1 illustrates an example of a communication system applicable to the present disclosure.

Referring to FIG. 1, the communication system 100 applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include a robot 100*a*, vehicles 100*b*-1 and 100*b*-2, an extended reality (XR) device 100*c*, a hand-held device 100*d*, a home appliance 100*e*, an Internet of Thing (IoT) device 100*f*, and an artificial intelligence (AI) device/server 100*g*. For example, the vehicles may include a vehicle having a wireless communication function, an autonomous vehicle, a vehicle capable of performing vehicle-to-vehicle communication, etc. The vehicles 100*b*-1 and 100*b*-2 may include an unmanned aerial vehicle (UAV) (e.g., a drone). The XR device 100*c* includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100*d* may include a smartphone, a smart pad, a wearable device (e.g., a smart watch or smart glasses), a computer (e.g., a laptop), etc. The home appliance 100*e* may include a TV, a refrigerator, a washing machine, etc. The IoT device 100*f* may include a sensor, a smart meter, etc. For example, the base station 120 and the network 130 may be implemented by a wireless device, and a specific wireless device 120*a* may operate as a base station/network node for another wireless device.

The wireless devices 100*a* to 100*f* may be connected to the network 130 through the base station 120. AI technology is applicable to the wireless devices 100*a* to 100*f*, and the wireless devices 100*a* to 100*f* may be connected to the AI server 100*g* through the network 130. The network 130 may be configured using a 3G network, a 4G (e.g., LTE) network or a 5G (e.g., NR) network, etc. The wireless devices 100*a* to 100*f* may communicate with each other through the base station 120/the network 130 or perform direct communication (e.g., sidelink communication) without through the base station 120/the network 130. For example, the vehicles 100*b*-1 and 100*b*-2 may perform direct communication (e.g., vehicle to vehicle (V2V)/vehicle to everything (V2X) communication). In addition, the IoT device 100*f* (e.g., a sensor) may perform direct communication with another IoT device (e.g., a sensor) or the other wireless devices 100*a* to 100*f*.

Wireless communications/connections 150*a*, 150*b* and 150*c* may be established between the wireless devices 100*a* to 100*f*/the base station 120 and the base station 120/the base station 120. Here, wireless communication/connection may be established through various radio access technologies (e.g., 5G NR) such as uplink/downlink communication 150*a*, sidelink communication 150*b* (or D2D communication) or communication 150*c* between base stations (e.g., relay, integrated access backhaul (IAB). The wireless device and the base station/wireless device or the base station and the base station may transmit/receive radio signals to/from each other through wireless communication/connection 150*a*, 150*b* and 150*c*. For example, wireless communication/connection 150*a*, 150*b* and 150*c* may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Communication System Applicable to the Present Disclosure

Figure 2:
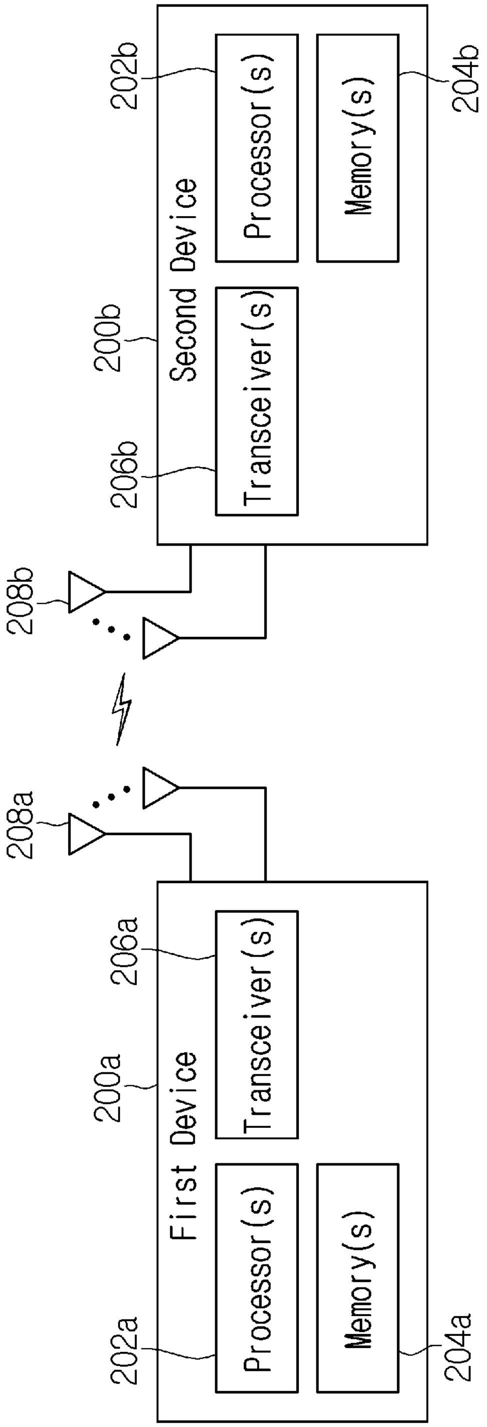
FIG. 2 illustrates an example of a wireless apparatus applicable to the present disclosure.

FIG. 2 illustrates an example of a wireless device applicable to the present disclosure.

Referring to FIG. 2, a first wireless device 200*a* and a second wireless device 200*b* may transmit and receive radio signals through various radio access technologies (e.g., LTE or NR). Here, {the first wireless device 200*a*, the second wireless device 200*b*} may correspond to {the wireless device 100*x*, the base station 120} and/or {the wireless device 100*x*, the wireless device 100*x*} of FIG. 1.

The first wireless device 200*a* may include one or more processors 202*a* and one or more memories 204*a* and may further include one or more transceivers 206*a* and/or one or more antennas 208*a*. The processor 202*a* may be configured to control the memory 204*a* and/or the transceiver 206*a* and to implement descriptions, functions, procedures, proposals, methods and/or operational flowcharts disclosed herein. For example, the processor 202*a* may process information in the memory 204*a* to generate first information/signal and then transmit a radio signal including the first information/signal through the transceiver 206*a*. In addition, the processor 202*a* may receive a radio signal including second information/signal through the transceiver 206*a* and then store information obtained from signal processing of the second information/signal in the memory 204*a*. The memory 204*a* may be coupled with the processor 202*a*, and store a variety of information related to operation of the processor 202*a*. For example, the memory 204*a* may store software code including instructions for performing all or some of the processes controlled by the processor 202*a* or performing the descriptions, functions, procedures, proposals, methods and/or operational flowcharts disclosed herein. Here, the processor 202*a* and the memory 204*a* may be part of a communication modem/circuit/chip designed to implement wireless communication technology (e.g., LTE or NR). The transceiver 206*a* may be coupled with the processor 202*a* to transmit and/or receive radio signals through one or more antennas 208*a*. The transceiver 206*a* may include a transmitter and/or a receiver. The transceiver 206*a* may be used interchangeably with a radio frequency (RF) unit. In the present disclosure, the wireless device may refer to a communication modem/circuit/chip.

The second wireless device 200*b* may include one or more processors 202*b* and one or more memories 204*b* and may further include one or more transceivers 206*b* and/or one or more antennas 208*b*. The processor 202*b* may be configured to control the memory 204*b* and/or the transceiver 206*b* and to implement the descriptions, functions, procedures, proposals, methods and/or operational flowcharts disclosed herein. For example, the processor 202*b* may process information in the memory 204*b* to generate third information/signal and then transmit the third information/signal through the transceiver 206*b*. In addition, the processor 202*b* may receive a radio signal including fourth information/signal through the transceiver 206*b* and then store information obtained from signal processing of the fourth information/signal in the memory 204*b*. The memory 204*b* may be coupled with the processor 202*b* to store a variety of information related to operation of the processor 202*b*. For example, the memory 204*b* may store software code including instructions for performing all or some of the processes controlled by the processor 202*b* or performing the descriptions, functions, procedures, proposals, methods and/or operational flowcharts disclosed herein. Herein, the processor 202*b* and the memory 204*b* may be part of a communication modem/circuit/chip designed to implement wireless communication technology (e.g., LTE or NR). The transceiver 206*b* may be coupled with the processor 202*b* to transmit and/or receive radio signals through one or more antennas 208*b*. The transceiver 206*b* may include a transmitter and/or a receiver. The transceiver 206*b* may be used interchangeably with a radio frequency (RF) unit. In the present disclosure, the wireless device may refer to a communication modem/circuit/chip.

Hereinafter, hardware elements of the wireless devices 200*a* and 200*b* will be described in greater detail. Without being limited thereto, one or more protocol layers may be implemented by one or more processors 202*a* and 202*b*. For example, one or more processors 202*a* and 202*b* may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202*a* and 202*b* may generate one or more protocol data units (PDUs) and/or one or more service data unit (SDU) according to the descriptions, functions, procedures, proposals, methods and/or operational flowcharts disclosed herein. One or more processors 202*a* and 202*b* may generate messages, control information, data or information according to the descriptions, functions, procedures, proposals, methods and/or operational flowcharts disclosed herein. One or more processors 202*a* and 202*b* may generate PDUs, SDUs, messages, control information, data or information according to the functions, procedures, proposals and/or methods disclosed herein and provide the PDUs, SDUs, messages, control information, data or information to one or more transceivers 206*a* and 206*b*. One or more processors 202*a* and 202*b* may receive signals (e.g., baseband signals) from one or more transceivers 206*a* and 206*b* and acquire PDUs, SDUs, messages, control information, data or information according to the descriptions, functions, procedures, proposals, methods and/or operational flowcharts disclosed herein.

One or more processors 202*a* and 202*b* may be referred to as controllers, microcontrollers, microprocessors or microcomputers. One or more processors 202*a* and 202*b* may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202*a* and 202*b*. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202*a* and 202*b* or stored in one or more memories 204*a* and 204*b* to be driven by one or more processors 202*a* and 202*b*. The descriptions, functions, procedures, proposals, methods and/or operational flowcharts disclosed herein implemented using firmware or software in the form of code, a command and/or a set of commands.

One or more memories 204*a* and 204*b* may be coupled with one or more processors 202*a* and 202*b* to store various types of data, signals, messages, information, programs, code, instructions and/or commands. One or more memories 204*a* and 204*b* may be composed of read only memories (ROMs), random access memories (RAMs), erasable programmable read only memories (EPROMs), flash memories, hard drives, registers, cache memories, computer-readable storage mediums and/or combinations thereof. One or more memories 204*a* and 204*b* may be located inside and/or outside one or more processors 202*a* and 202*b*. In addition, one or more memories 204*a* and 204*b* may be coupled with one or more processors 202*a* and 202*b* through various technologies such as wired or wireless connection.

One or more transceivers 206*a* and 206*b* may transmit user data, control information, radio signals/channels, etc. described in the methods and/or operational flowcharts of the present disclosure to one or more other apparatuses. One or more transceivers 206*a* and 206*b* may receive user data, control information, radio signals/channels, etc. described in the methods and/or operational flowcharts of the present disclosure from one or more other apparatuses. For example, one or more transceivers 206*a* and 206*b* may be coupled with one or more processors 202*a* and 202*b* to transmit/receive radio signals. For example, one or more processors 202*a* and 202*b* may perform control such that one or more transceivers 206*a* and 206*b* transmit user data, control information or radio signals to one or more other apparatuses. In addition, one or more processors 202*a* and 202*b* may perform control such that one or more transceivers 206*a* and 206*b* receive user data, control information or radio signals from one or more other apparatuses. In addition, one or more transceivers 206*a* and 206*b* may be coupled with one or more antennas 208*a* and 208*b*, and one or more transceivers 206*a* and 206*b* may be configured to transmit/receive user data, control information, radio signals/channels, etc. described in the descriptions, functions, procedures, proposals, methods and/or operational flowcharts disclosed herein through one or more antennas 208*a* and 208*b*. In the present disclosure, one or more antennas may be a plurality of physical antennas or a plurality of logical antennas (e.g., antenna ports). One or more transceivers 206*a* and 206*b* may convert the received radio signals/channels, etc. from RF band signals to baseband signals, in order to process the received user data, control information, radio signals/channels, etc. using one or more processors 202*a* and 202*b*. One or more transceivers 206*a* and 206*b* may convert the user data, control information, radio signals/channels processed using one or more processors 202*a* and 202*b* from baseband signals into RF band signals. To this end, one or more transceivers 206*a* and 206*b* may include (analog) oscillator and/or filters.

Structure of Wireless Device Applicable to the Present Disclosure

Figure 3:
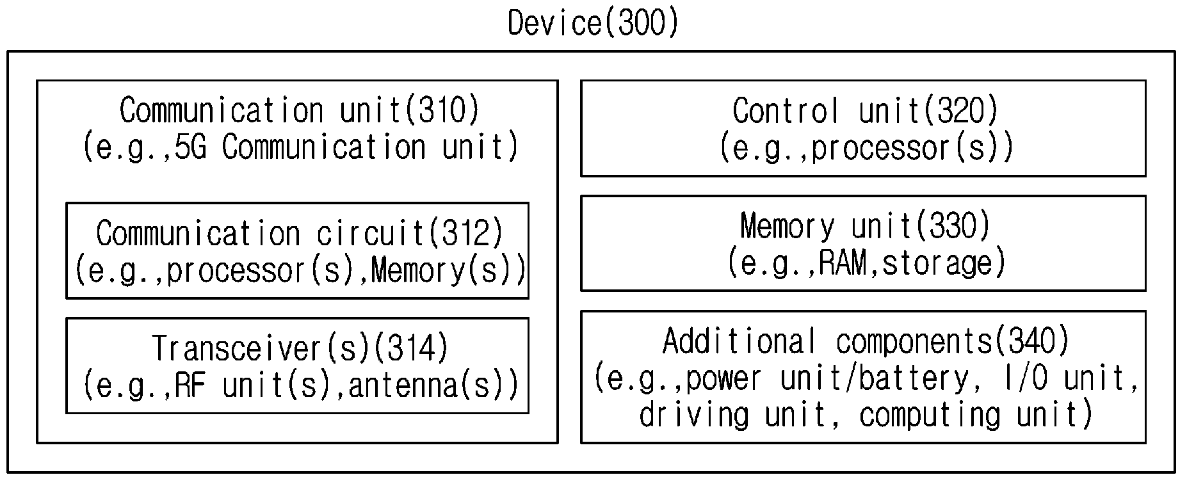
FIG. 3 illustrates another example of a wireless device applicable to the present disclosure.

FIG. 3 illustrates another example of a wireless device applicable to the present disclosure.

Referring to FIG. 3, a wireless device 300 may correspond to the wireless devices 200*a* and 200*b* of FIG. 2 and include various elements, components, units/portions and/or modules. For example, the wireless device 300 may include a communication unit 310, a control unit (controller) 320, a memory unit (memory) 330 and additional components 340. The communication unit may include a communication circuit 312 and a transceiver(s) 314. For example, the communication circuit 312 may include one or more processors 202*a* and 202*b* and/or one or more memories 204*a* and 204*b* of FIG. 2. For example, the transceiver(s) 314 may include one or more transceivers 206*a* and 206*b* and/or one or more antennas 208*a* and 208*b* of FIG. 2. The control unit 320 may be electrically coupled with the communication unit 310, the memory unit 330 and the additional components 340 to control overall operation of the wireless device. For example, the control unit 320 may control electrical/mechanical operation of the wireless device based on a program/code/instruction/information stored in the memory unit 330. In addition, the control unit 320 may transmit the information stored in the memory unit 330 to the outside (e.g., another communication device) through the wireless/wired interface using the communication unit 310 over a wireless/wired interface or store information received from the outside (e.g., another communication device) through the wireless/wired interface using the communication unit 310 in the memory unit 330.

The additional components 340 may be variously configured according to the types of the wireless devices. For example, the additional components 340 may include at least one of a power unit/battery, an input/output unit, a driving unit or a computing unit. Without being limited thereto, the wireless device 300 may be implemented in the form of the robot (FIG. 1, 100*a*), the vehicles (FIGS. 1, 100*b*-1 and 100*b*-2), the XR device (FIG. 1, 100*c*), the hand-held device (FIG. 1, 100*d*), the home appliance (FIG. 1, 100*e*), the IoT device (FIG. 1, 100*f*), a digital broadcast terminal, a hologram apparatus, a public safety apparatus, an MTC apparatus, a medical apparatus, a Fintech device (financial device), a security device, a climate/environment device, an AI server/device (FIG. 1, 140), the base station (FIG. 1, 120), a network node, etc. The wireless device may be movable or may be used at a fixed place according to use example/service.

In FIG. 3, various elements, components, units/portions and/or modules in the wireless device 300 may be coupled with each other through wired interfaces or at least some thereof may be wirelessly coupled through the communication unit 310. For example, in the wireless device 300, the control unit 320 and the communication unit 310 may be coupled by wire, and the control unit 320 and the first unit (e.g., 130 or 140) may be wirelessly coupled through the communication unit 310. In addition, each element, component, unit/portion and/or module of the wireless device 300 may further include one or more elements. For example, the control unit 320 may be composed of a set of one or more processors. For example, the control unit 320 may be composed of a set of a communication control processor, an application processor, an electronic control unit (ECU), a graphic processing processor, a memory control processor, etc. In another example, the memory unit 330 may be composed of a random access memory (RAM), a dynamic RAM (DRAM), a read only memory (ROM), a flash memory, a volatile memory, a non-volatile memory and/or a combination thereof.

Hand-Held Device Applicable to the Present Disclosure

Figure 4:
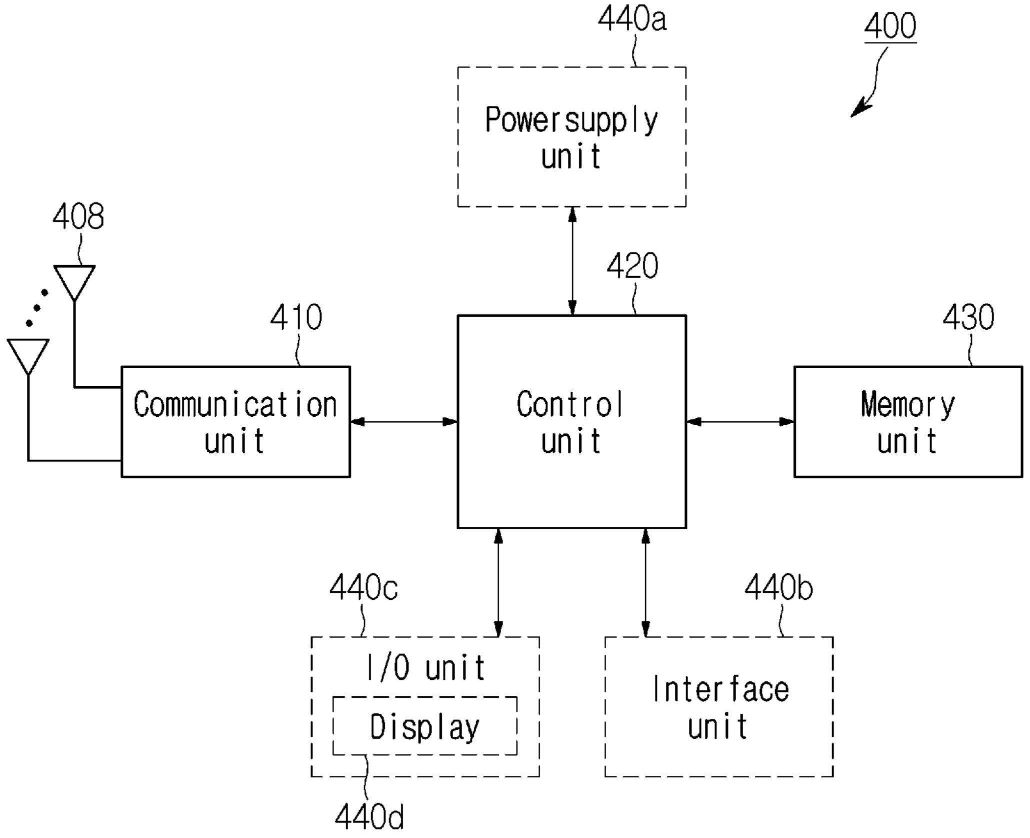
FIG. 4 illustrates an example of a hand-held device applicable to the present disclosure.

FIG. 4 illustrates an example of a hand-held device applicable to the present disclosure.

FIG. 4 shows a hand-held device applicable to the present disclosure. The hand-held device may include a smartphone, a smart pad, a wearable device (e.g., a smart watch or smart glasses), and a hand-held computer (e.g., a laptop, etc.). The hand-held device may be referred to as a mobile station (MS), a user terminal (UT), a mobile subscriber station (MSS), a subscriber station (SS), an advanced mobile station (AMS) or a wireless terminal (WT).

Referring to FIG. 4, the hand-held device 400 may include an antenna unit (antenna) 408, a communication unit (transceiver) 410, a control unit (controller) 420, a memory unit (memory) 430, a power supply unit (power supply) 440*a*, an interface unit (interface) 440*b*, and an input/output unit 440*c*. An antenna unit (antenna) 408 may be part of the communication unit 410. The blocks 410 to 430/440*a* to 440*c* may correspond to the blocks 310 to 330/340 of FIG. 3, respectively.

The communication unit 410 may transmit and receive signals (e.g., data, control signals, etc.) to and from other wireless devices or base stations. The control unit 420 may control the components of the hand-held device 400 to perform various operations. The control unit 420 may include an application processor (AP). The memory unit 430 may store data/parameters/program/code/instructions necessary to drive the hand-held device 400. In addition, the memory unit 430 may store input/output data/information, etc. The power supply unit 440*a* may supply power to the hand-held device 400 and include a wired/wireless charging circuit, a battery, etc. The interface unit 440*b* may support connection between the hand-held device 400 and another external device. The interface unit 440*b* may include various ports (e.g., an audio input/output port and a video input/output port) for connection with the external device. The input/output unit 440*c* may receive or output video information/signals, audio information/signals, data and/or user input information. The input/output unit 440*c* may include a camera, a microphone, a user input unit, a display 440*d*, a speaker and/or a haptic module.

For example, in case of data communication, the input/output unit 440*c* may acquire user input information/signal (e.g., touch, text, voice, image or video) from the user and store the user input information/signal in the memory unit 430. The communication unit 410 may convert the information/signal stored in the memory into a radio signal and transmit the converted radio signal to another wireless device directly or transmit the converted radio signal to a base station. In addition, the communication unit 410 may receive a radio signal from another wireless device or the base station and then restore the received radio signal into original information/signal. The restored information/signal may be stored in the memory unit 430 and then output through the input/output unit 440*c* in various forms (e.g., text, voice, image, video and haptic).

Type of Wireless Device Applicable to the Present Disclosure

Figure 5:
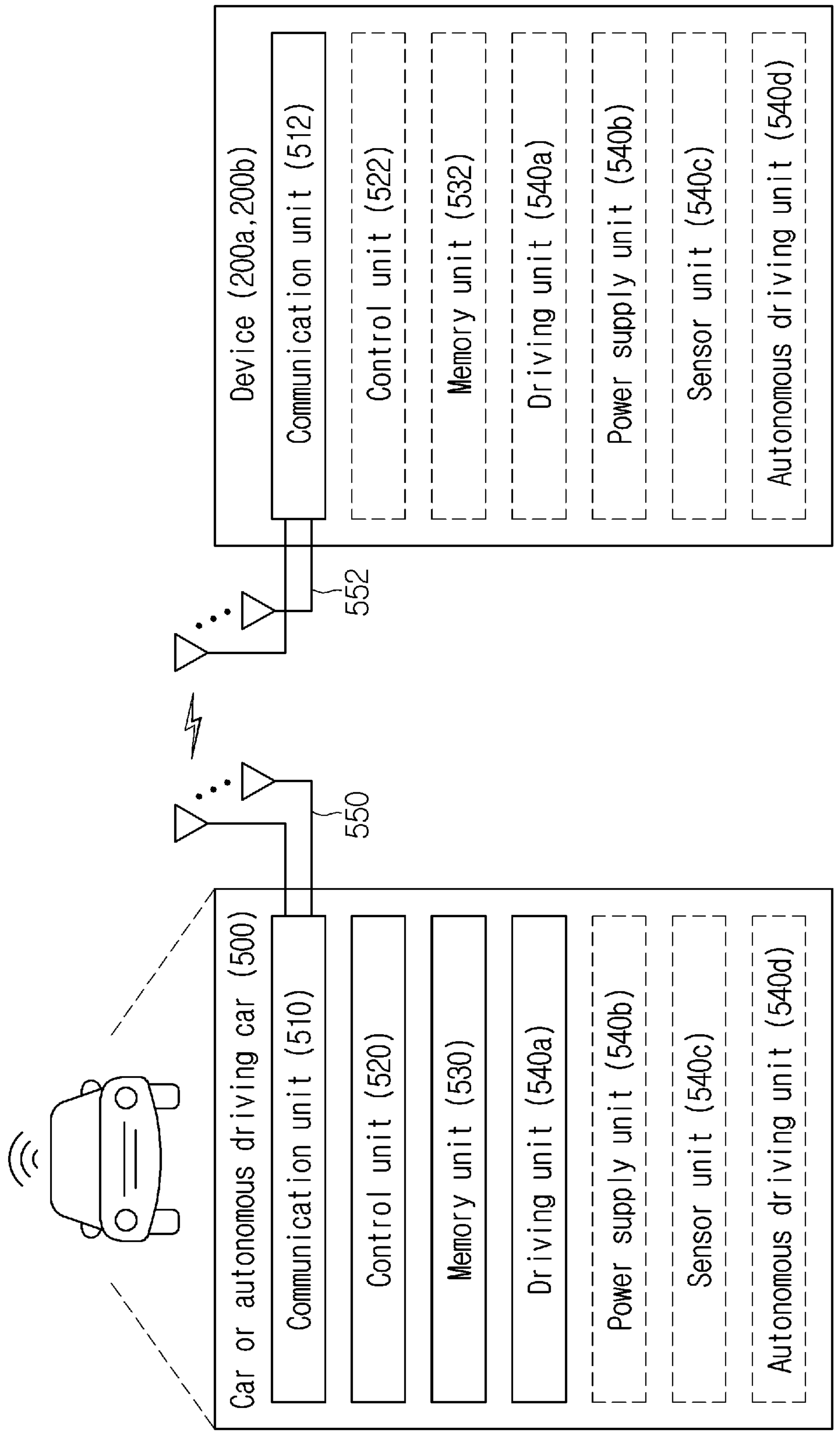
FIG. 5 illustrates an example of a car or an autonomous driving car applicable to the present disclosure.

FIG. 5 illustrates an example of a car or an autonomous driving car applicable to the present disclosure.

FIG. 5 shows a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited.

Referring to FIG. 5, the car or autonomous driving car 500 may include an antenna unit (antenna) 508, a communication unit (transceiver) 510, a control unit (controller) 520, a driving unit 540*a*, a power supply unit (power supply) 540*b*, a sensor unit 540*c*, and an autonomous driving unit 540*d*. The antenna unit 550 may be configured as part of the communication unit 510. The blocks 510/530/540*a* to 540*d* correspond to the blocks 410/430/440 of FIG. 4.

The communication unit 510 may transmit and receive signals (e.g., data, control signals, etc.) to and from external devices such as another vehicle, a base station (e.g., a base station, a road side unit, etc.), and a server. The control unit 520 may control the elements of the car or autonomous driving car 500 to perform various operations. The control unit 520 may include an electronic control unit (ECU).

Figure 6:
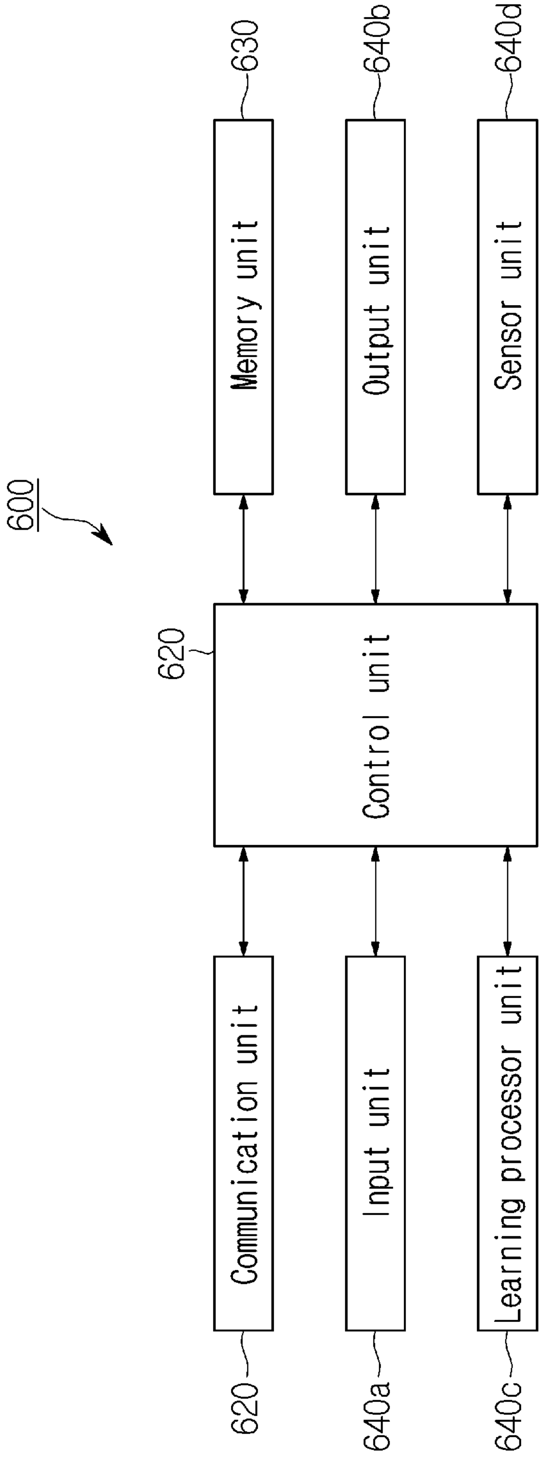
FIG. 6 illustrates an example of artificial intelligence (AI) device applicable to the present disclosure.

FIG. 6 illustrates an example of artificial intelligence (AI) device applicable to the present disclosure. For example, the AI device may be implemented as fixed or movable devices such as a TV, a projector, a smartphone, a PC, a laptop, a digital broadcast terminal, a tablet PC, a wearable device, a set-top box (STB), a radio, a washing machine, a refrigerator, a digital signage, a robot, a vehicle, or the like.

Referring to FIG. 6, the AI device 600 may include a communication unit (transceiver) 610, a control unit (controller) 620, a memory unit (memory) 630, an input/output unit 640*a*/640*b*, a leaning processor unit (learning processor) 640*c* and a sensor unit 640*d*. The blocks 610 to 630/640*a* to 640*d* may correspond to the blocks 310 to 330/340 of FIG. 3, respectively.

The communication unit 610 may transmit and receive wired/wireless signals (e.g., sensor information, user input, learning models, control signals, etc.) to and from external devices such as another AI device (e.g., FIG. 1, 100*x*, 120 or 140) or the AI server (FIG. 1, 140) using wired/wireless communication technology. To this end, the communication unit 610 may transmit information in the memory unit 630 to an external device or transfer a signal received from the external device to the memory unit 630.

The control unit 620 may determine at least one executable operation of the AI device 600 based on information determined or generated using a data analysis algorithm or a machine learning algorithm. In addition, the control unit 620 may control the components of the AI device 600 to perform the determined operation. For example, the control unit 620 may request, search for, receive or utilize the data of the learning processor unit 640*c* or the memory unit 630, and control the components of the AI device 600 to perform predicted operation or operation, which is determined to be desirable, of at least one executable operation. In addition, the control unit 620 may collect history information including operation of the AI device 600 or user's feedback on the operation and store the history information in the memory unit 630 or the learning processor unit 640*c* or transmit the history information to the AI server (FIG. 1, 140). The collected history information may be used to update a learning model.

The memory unit 630 may store data supporting various functions of the AI device 600. For example, the memory unit 630 may store data obtained from the input unit 640*a*, data obtained from the communication unit 610, output data of the learning processor unit 640*c*, and data obtained from the sensing unit 640. In addition, the memory unit 630 may store control information and/or software code necessary to operate/execute the control unit 620.

The input unit 640*a* may acquire various types of data from the outside of the AI device 600. For example, the input unit 640*a* may acquire learning data for model learning, input data, to which the learning model will be applied, etc. The input unit 640*a* may include a camera, a microphone and/or a user input unit. The output unit 640*b* may generate video, audio or tactile output. The output unit 640*b* may include a display, a speaker and/or a haptic module. The sensing unit 640 may obtain at least one of internal information of the AI device 600, the surrounding environment information of the AI device 600 and user information using various sensors. The sensing unit 640 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 640*c* may train a model composed of an artificial neural network using training data. The learning processor unit 640*c* may perform AI processing along with the learning processor unit of the AI server (FIG. 1, 140). The learning processor unit 640*c* may process information received from an external device through the communication unit 610 and/or information stored in the memory unit 630. In addition, the output value of the learning processor unit 640*c* may be transmitted to the external device through the communication unit 610 and/or stored in the memory unit 630.

Figure 7:
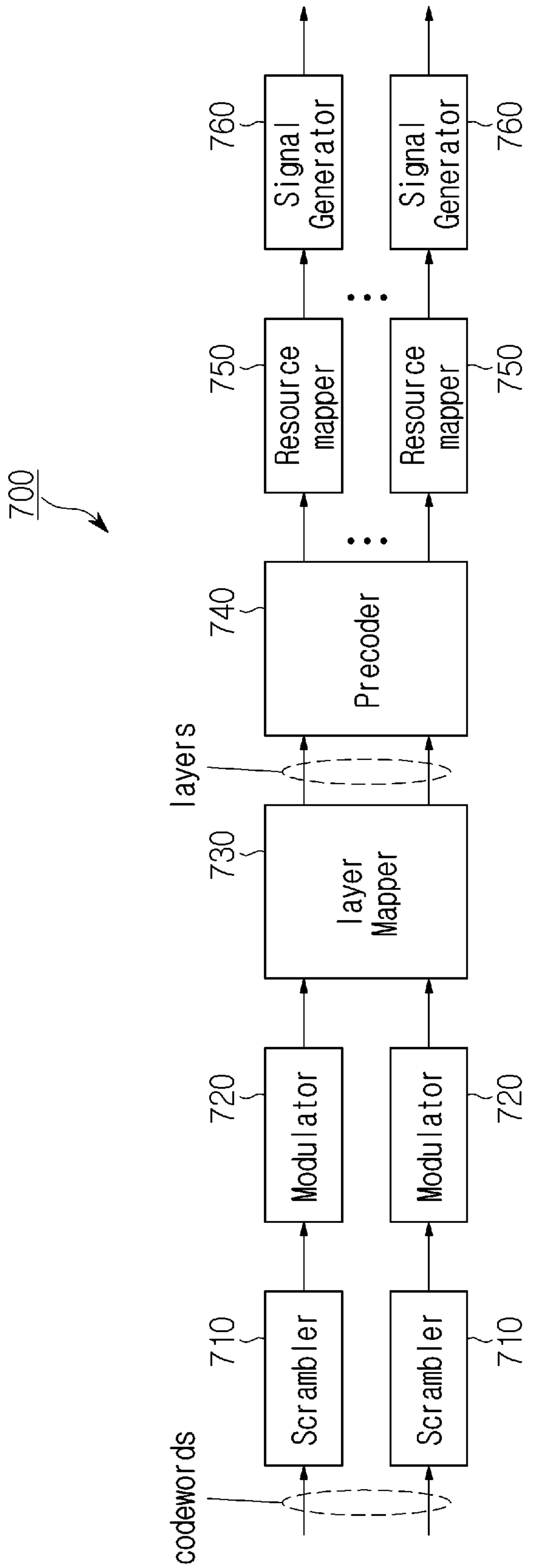
FIG. 7 illustrates physical channels applicable to the present disclosure and a signal transmission method using the same.
Figure 8:
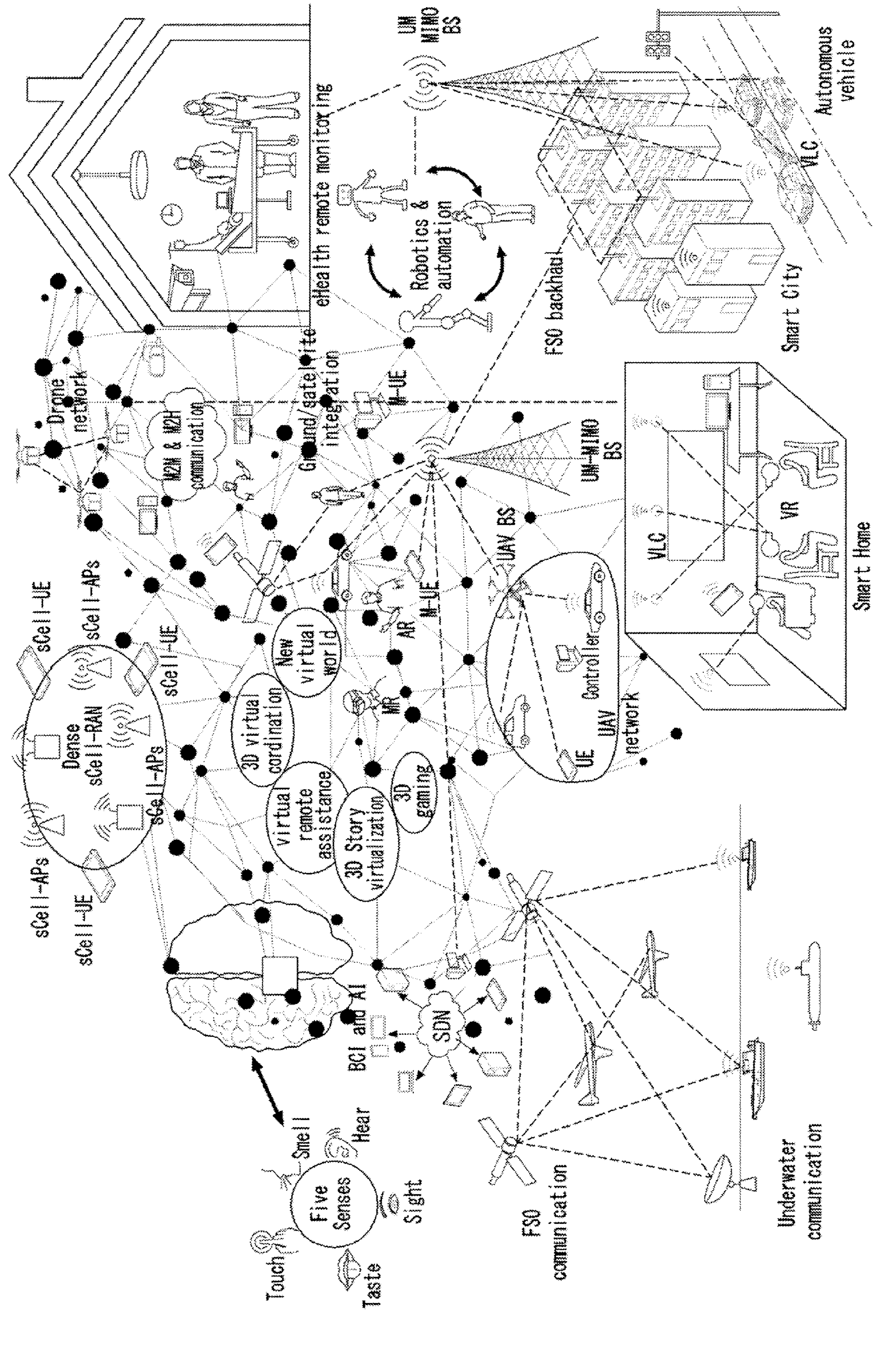
FIG. 8 illustrates an example of a communication structure providable in a 6th generation (6G) system applicable to the present disclosure.

FIG. 7 illustrates a method of processing a transmitted signal applicable to the present disclosure. For example, the transmitted signal may be processed by a signal processing circuit. At this time, a signal processing circuit 700 may include a scrambler 710, a modulator 720, a layer mapper 730, a precoder 740, a resource mapper 750, and a signal generator 760. At this time, for example, the operation/function of FIG. 7 may be performed by the processors 202*a* and 202*b* and/or the transceiver 206*a* and 206*b* of FIG. 2. In addition, for example, the hardware element of FIG. 7 may be implemented in the processors 202*a* and 202*b* of FIG. 2 and/or the transceivers 206*a* and 206*b* of FIG. 2. For example, blocks 1010 to 1060 may be implemented in the processors 202*a* and 202*b* of FIG. 2. In addition, blocks 710 to 750 may be implemented in the processors 202*a* and 202*b* of FIG. 2 and a block 760 may be implemented in the transceivers 206*a* and 206*b* of FIG. 2, without being limited to the above-described embodiments.

A codeword may be converted into a radio signal through the signal processing circuit 700 of FIG. 7. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 10. Specifically, the codeword may be converted into a bit sequence scrambled by the scrambler 710. The scramble sequence used for scramble is generated based in an initial value and the initial value may include ID information of a wireless device, etc. The scrambled bit sequence may be modulated into a modulated symbol sequence by the modulator 720. The modulation method may include pi/2-binary phase shift keying (pi/2-BPSK), m-phase shift keying (m-PSK), m-quadrature amplitude modulation (m-QAM), etc.

A complex modulation symbol sequence may be mapped to one or more transport layer by the layer mapper 730. Modulation symbols of each transport layer may be mapped to corresponding antenna port(s) by the precoder 740 (precoding). The output z of the precoder 740 may be obtained by multiplying the output y of the layer mapper 730 by an N*M precoding matrix W. Here, N may be the number of antenna ports and M may be the number of transport layers. Here, the precoder 740 may perform precoding after transform precoding (e.g., discrete Fourier transform (DFT)) for complex modulation symbols. In addition, the precoder 740 may perform precoding without performing transform precoding.

The resource mapper 750 may map modulation symbols of each antenna port to time-frequency resources. The time-frequency resources may include a plurality of symbols (e.g., a CP-OFDMA symbol and a DFT-s-OFDMA symbol) in the time domain and include a plurality of subcarriers in the frequency domain. The signal generator 760 may generate a radio signal from the mapped modulation symbols, and the generated radio signal may be transmitted to another device through each antenna. To this end, the signal generator 760 may include an inverse fast Fourier transform (IFFT) module, a cyclic prefix (CP) insertor, a digital-to-analog converter (DAC), a frequency uplink converter, etc.

A signal processing procedure for a received signal in the wireless device may be configured as the inverse of the signal processing procedures 710 to 760 of FIG. 7. For example, the wireless device (e.g., 200*a* or 200*b* of FIG. 2) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to a codeword through a resource de-mapper process, a postcoding process, a demodulation process and a de-scrambling process. The codeword may be restored to an original information block through decoding. Accordingly, a signal processing circuit (not shown) for a received signal may include a signal restorer, a resource de-mapper, a postcoder, a demodulator, a de-scrambler and a decoder.

6G Communication System

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as “intelligent connectivity”, “deep connectivity”, “holographic connectivity” and “ubiquitous connectivity”, and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 10:
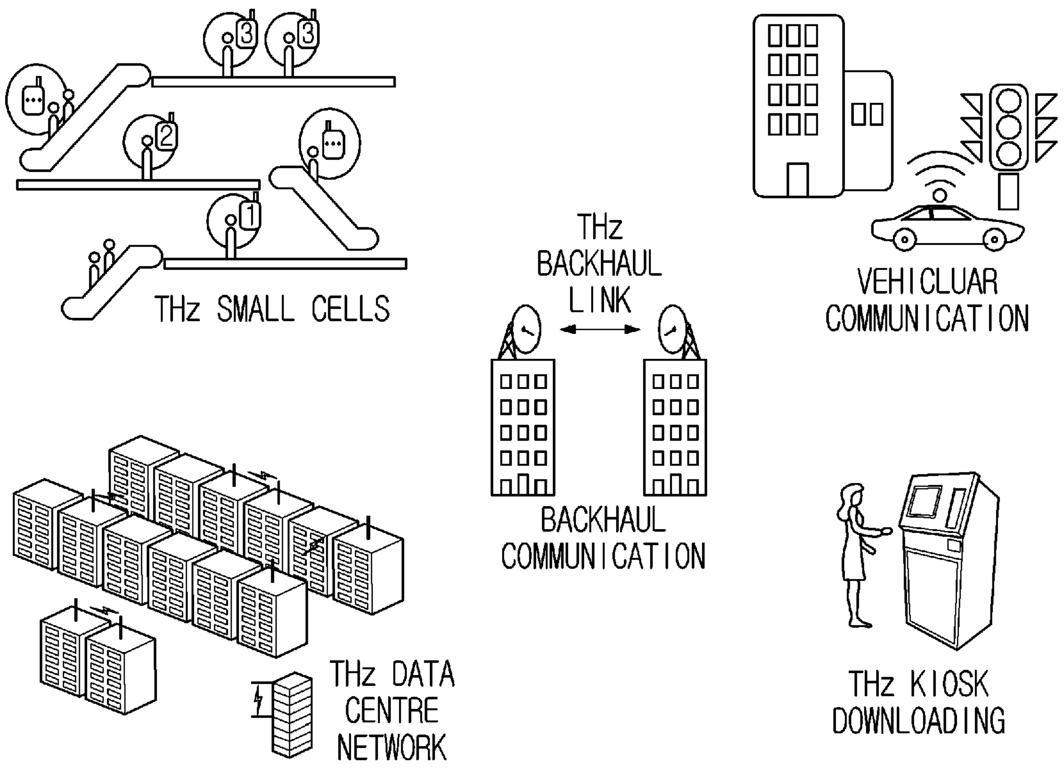
FIG. 10 is a view showing a THz communication method applicable to the present disclosure.

FIG. 10 illustrates an example of a communication structure providable in a 6G system applicable to the present disclosure.

Referring to FIG. 10, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system.

Core Implementation Technology of 6G System

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to build a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

Terahertz (THz) Communication

THz communication is applicable to the 6G system. For example, a data rate may increase by increasing bandwidth. This may be performed by using sub-THz communication with wide bandwidth and applying advanced massive MIMO technology.

Figure 9:
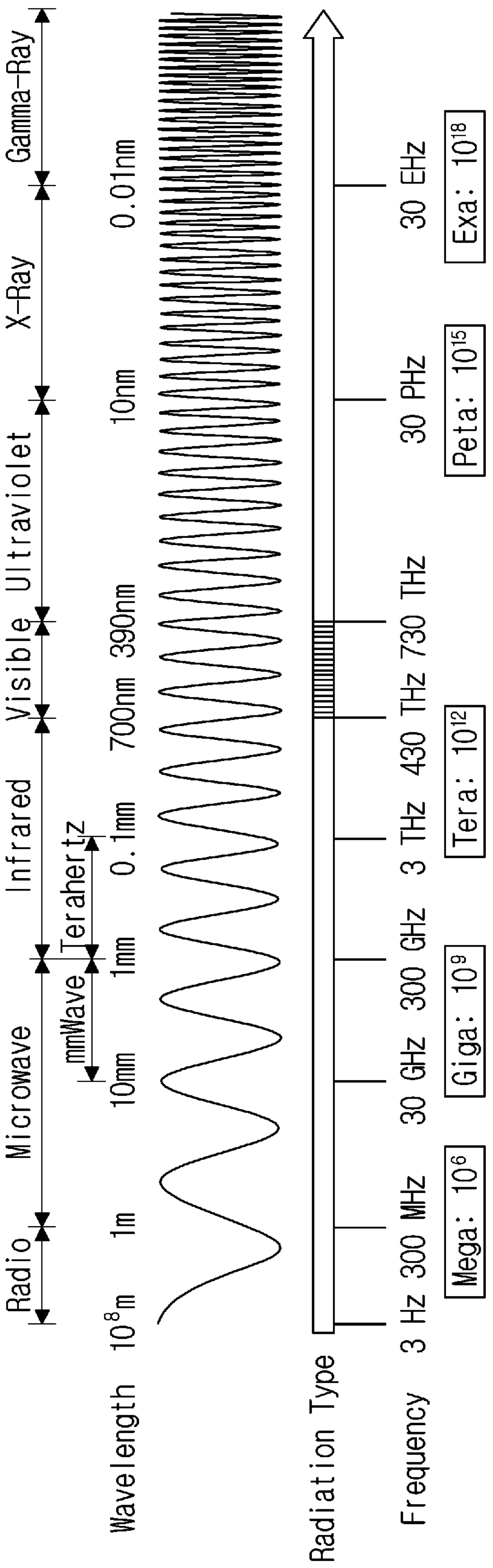
FIG. 9 is a view showing an electromagnetic spectrum applicable to the present disclosure.

FIG. 9 is a view showing an electromagnetic spectrum applicable to the present disclosure. For example, referring to FIG. 16, THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated by the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

THz Wireless Communication

FIG. 10 is a view showing a THz communication method applicable to the present disclosure.

Referring to FIG. 10, THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence.

SPECIFIC EMBODIMENTS OF THE PRESENT DISCLOSURE

The present disclosure is directed to effectively performing retransmission in a wireless communication system, and more particularly, to a technology for effectively performing retransmission for transport blocks (TBs) hierarchically designed in a wireless communication system.

The hybrid automatic repeat request (HARQ), which is applied to various wireless communication systems such as LTE and NR, is a combination of forward error correction (FEC) and automatic repeat request (ARQ) and is a technology for enhancing transmission efficiency in a communication system. A transmitter transmits data encoded to a FEC code. A receiver decodes a received signal, checks whether a data TB has an error, and if the error is detected, requests retransmission to the transmitter. The transmitter retransmits data encoded to a FEC code, and the receiver combines the previously received signal and a newly received signal and then decodes, so that a coding gain may be increased and an error probability may be lowered. Herein, for the retransmission, it is possible to apply either a chase combining (CC) scheme transmitting the same encoding data as previously transmitted data or an incremental redundancy (IR) scheme transmitting encoding data including a new parity bit. The IR scheme is more complicated than the CC scheme but has better performance.

With the increase in the transmission speed of a communication system, the size of a TB has gradually increased.

Accordingly, in order to improve retransmission efficiency, a transmission technique dividing a single TB into a plurality of code blocks (CBs) has been developed. A transmitter adds a cyclic redundancy check (CRC) not only to an entire TB but also to each CB, and a receiver checks a CRC of each CB to see whether each CB has an error and requests retransmission only for a CB with error. Thus, a radio resource needed for retransmission may be saved, and transmission efficiency may be improved. However, since it is necessary for a receiver to forward whether retransmission is needed for each CB to a transmitter, there is a disadvantage in that the amount of necessary radio resources increases. In 5G NR, the size of a TB further increases along with the increase of transmission speed, and thus the number of CBs and the amount of information for requesting retransmission further increase. Accordingly, the 5G NR system adopted a technique of retransmission in a unit of code block group (CBG) that binds a plurality of CBs. An example of a transmission technique based on a CBG in 5G NR is shown in FIG. 11 below.

Figure 11:
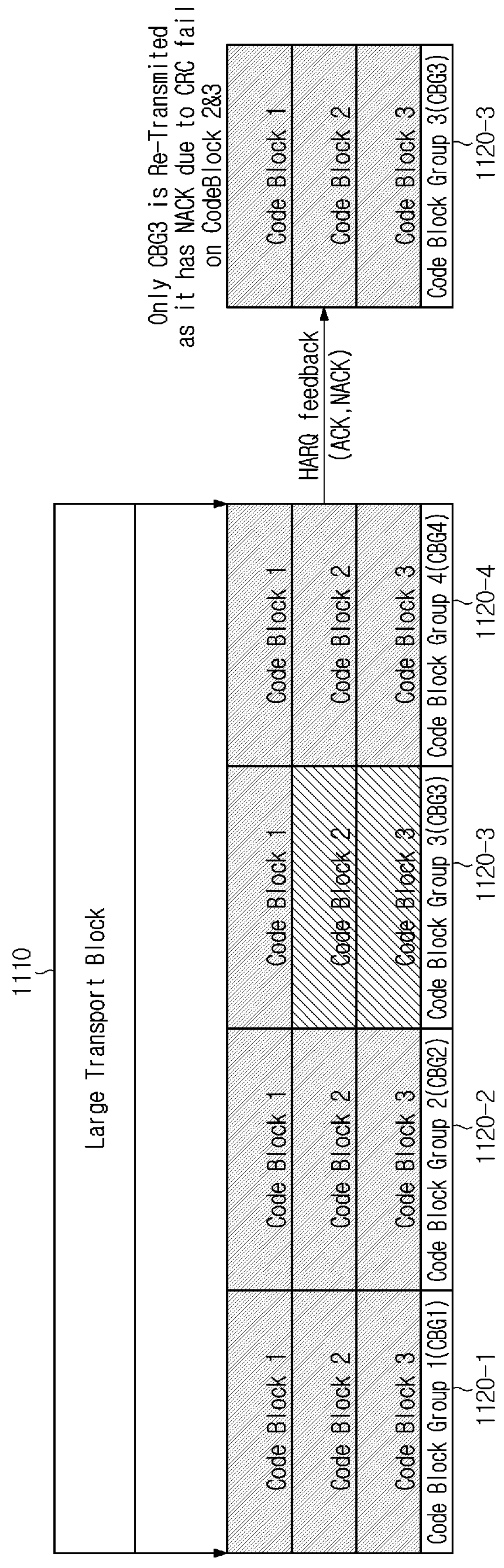
FIG. 11 illustrates an example of transmission based on a code block group in a 5G communication system.

FIG. 11 illustrates an example of transmission based on a code block group in a 5G communication system. Referring to FIG. 11, a transport block (TB) 1110 is divided into a plurality of code blocks (CBs), and three CBs form one code block group (CBG). In the example of FIG. 11, four CBGs 1120-1 to 1120-4 are formed. When the TB 1110 is transmitted, a receiver determines whether decoding is successful in each CB. In the example of FIG. 11, a negative acknowledge (NACK) occurs for two CBs in a third CBG 1120-3, and the third CBG 1120-3 is retransmitted accordingly.

A HARQ-based transmission and retransmission procedure is managed according to each HARQ process. The HARQ process is a concept corresponding to a transmission unit of data and is associated with initial transmission and retransmission of a single data unit. When data associated with one HARQ process starts to be transmitted, no new data associated with the HARQ process is transmitted until the data is successfully transmitted through transmission and retransmission or it is determined that the data is to be discarded due to transmission failure. For example, a constraint on transmission of new data due to a HARQ process is shown in FIG. 12A.

Figure 12A:
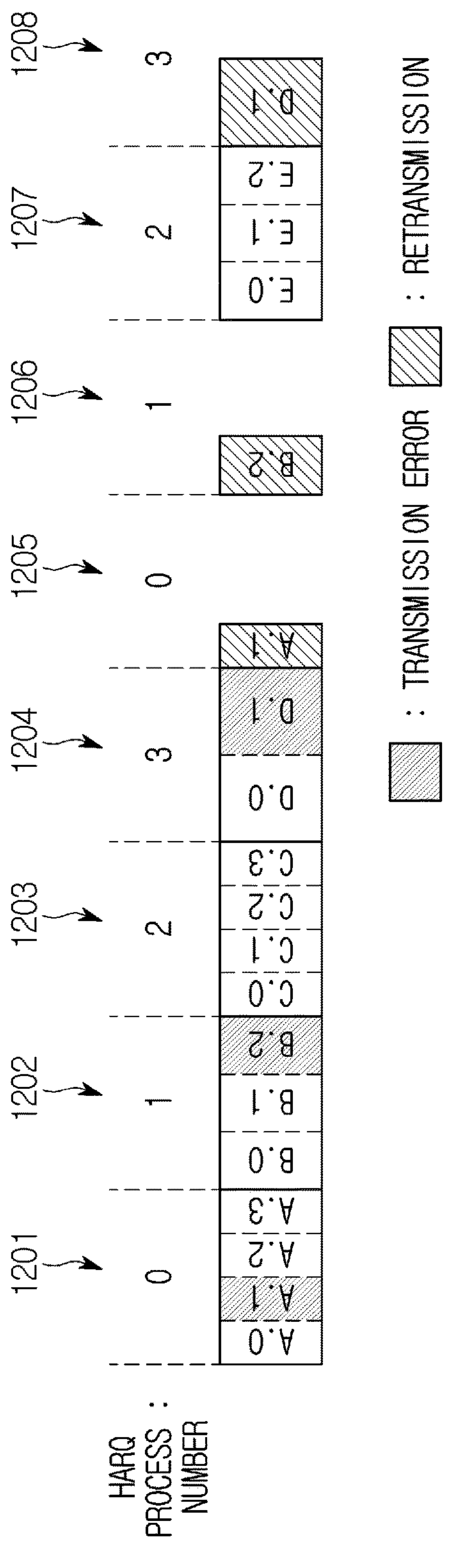
FIG. 12A illustrates an example of a retransmission pattern of transport blocks in a 5G communication system.

FIG. 12A illustrates an example of a retransmission pattern of transport blocks in a 5G communication system. FIG. 12A exemplifies HARQ process operation according to the related art and the proposed technique.

Referring to FIG. 12A, HARQ process numbers may be set to four values of 0, 1, 2, and 3. That is, four HARQ processes may be operated at the same time, and the values 0, 1, 2 and 3 are allocated by rotation according to progress of TTIs 1201 to 1208.

A.0, A.1, A.2, and A.3 are transmitted in the first TTI 1201, and an error occurs in at least one CB included in A.1. B.0, B.1, and B.2 are transmitted in the second TTI 1202, and an error occurs in at least one CB included in B.2. C.0, C.1, C.2, and C.3 are transmitted in the third TTI 1203, and no error occurs. D.0 and D.1 are transmitted in the fourth TTI 1204, and an error occurs in at least one CB included in D.1. Accordingly, retransmission of A.1, B.2 and D.1 will be required.

As A.1 is associated with the HARQ process number 0, the HARQ process number 0 is not used to transmit other new data until transmission of A.1 is completed or abandoned. Accordingly, A.1 is retransmitted in the fifth TTI 1205, and no new data is transmitted even when there is a plenty of resources. Similarly, B.2 is retransmitted in the sixth TTI 1206, D1 is retransmitted in the eighth TTI 1208, and no other new data is transmitted. As there is no transmission associated with the HARQ process number 2 in the seventh TTI 1207, new data E.0, E.1, and E.2 are transmitted.

As described above, no new data is transmitted in TTIs 1205, 1206 and 1208 where a HARQ process associated with retransmitted data is used. Only when every transmission error is recovered by retransmission or retransmission is completed as many times as a maximum permissible number, transmission of new data becomes possible. Thus, the larger the number of HARQ processes where a transmission error occurs, the lower the transmission speed. Accordingly, the present disclosure proposes a technique that enables the retransmission pattern shown in FIG. 12B below.

Figure 12B:
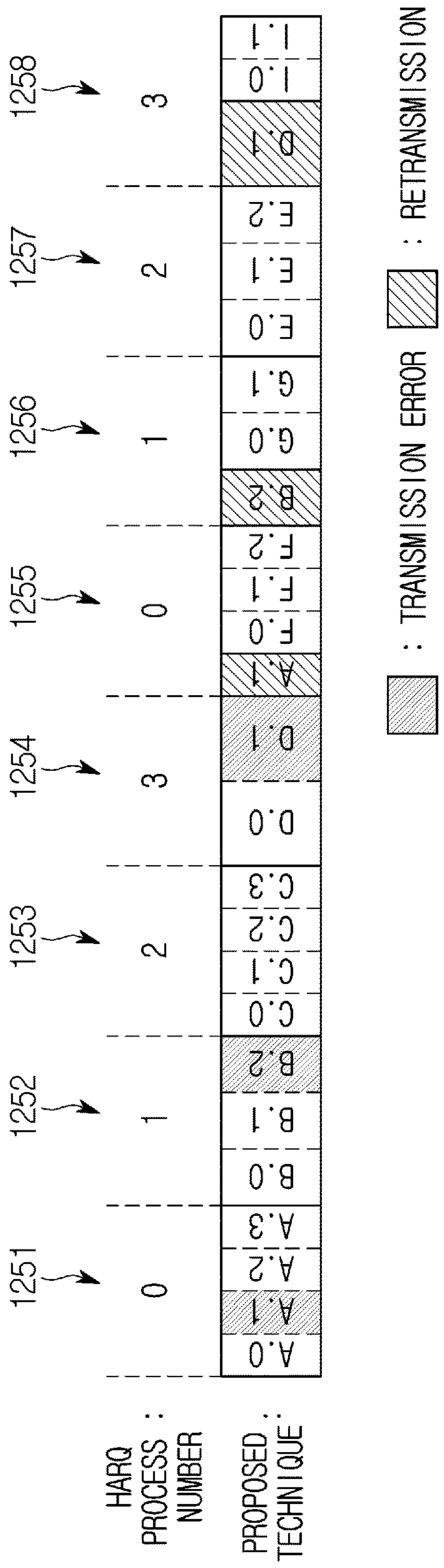
FIG. 12B illustrates an example of a retransmission pattern of transport blocks in a wireless communication system according to an embodiment of the present disclosure.

FIG. 12B illustrates an example of a retransmission pattern of transport blocks in a wireless communication system according to an embodiment of the present disclosure.

Referring to FIG. 12B, HARQ process numbers may be set to four values of 0, 1, 2, and 3. That is, four HARQ processes may be operated at the same time, and the values 0, 1, 2 and 3 are allocated by rotation according to progress of TTIs 1251 to 1258. Herein, one TTI is generated by one physical layer control signal (e.g., DCI).

A.0, A.1, A.2, and A.3 are transmitted in the first TTI 1251, and an error occurs in at least one CB included in A.1. B.0, B.1, and B.2 are transmitted in the second TTI 1252, and an error occurs in at least one CB included in B.2. C.0, C.1, C.2, and C.3 are transmitted in the third TTI 1253, and no error occurs. D.0 and D.1 are transmitted in the fourth TTI 1254, and an error occurs in at least one CB included in D.1. Accordingly, retransmission of A.1, B.2 and D.1 will be required.

In FIG. 12B, compared with FIG. 12A, A.1 associated with the HARQ process number 0 is retransmitted in the fifth TTI 1255, and new data units F.0, F.1 and F.2 may be transmitted together through a remaining resource. Similarly, B.2 associated with the HARQ process number 1 is retransmitted in the sixth TTI 1256, and new data units G.0 and G.1 may be transmitted together through a remaining resource. In addition, D.1 associated with the HARQ process number 3 is retransmitted in the eighth TTI 1258, and new data units I.0 and I.1 may be transmitted through a remaining resource.

As shown in FIG. 12B, when new data is transmitted in a HARQ process performing retransmission, overall transmission efficiency and speed may be enhanced. Accordingly, the present disclosure describes various embodiments about a transmission structure for enhancing overall transmission efficiency and speed by transmitting new data together in a HARQ process of performing retransmission due to an error occurring in some CBs and management of HARQ-related information.

A HARQ process is managed using a HARQ process number (PN), a new data indicator (NDI), a redundancy version (RV), and a modulation and coding scheme (MCS). Each HARQ process is distinguished by a HARQ PN, and an NDI indicates new data transmission or retransmission by a corresponding HARQ process. In systems like 4G LTE and 5G NR, the above-described information is delivered as DCI through a physical downlink control channel (PDCCH).

To enable transmission of new data together with retransmission data in a single HARQ process, information capable of distinguishing two types of data, that is, information is needed to inform whether each data is retransmitted or new data. As RVs and MCSs applied to retransmission data and new data may be different, a RV and an MCS corresponding to each data may be needed. Additionally, information on a size of retransmission data and a size of new data is needed. As a PDCCH is a channel requiring high reliability and uses a lot of communication resources, transmitting such additional information through the PDDCCH may be a great burden. Accordingly, the present disclosure proposes a data transmission structure as shown in FIG. 13 below.

Figure 13:
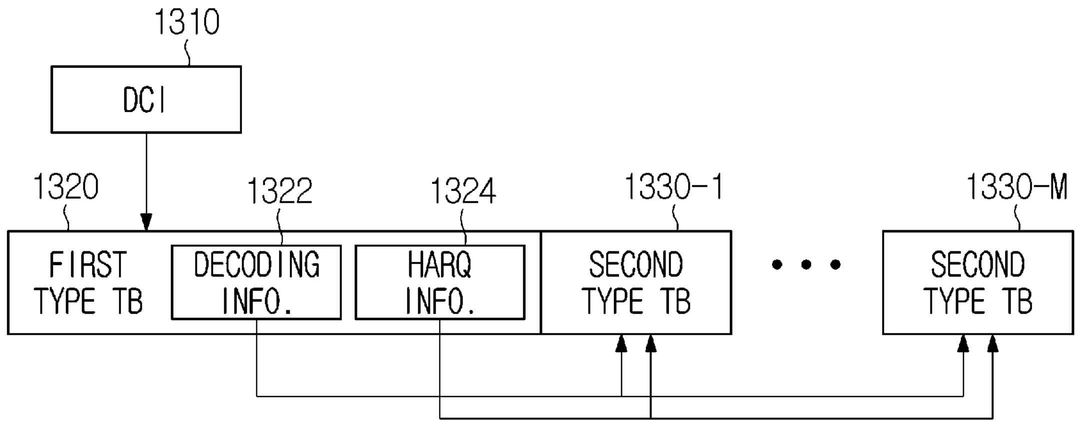
FIG. 13 illustrates an example of a transmission structure in a wireless communication system according to an embodiment of the present disclosure.

FIG. 13 illustrates an example of a transmission structure in a wireless communication system according to an embodiment of the present disclosure. FIG. 13 exemplifies a DCI 1310 and a plurality of transport blocks (TBs) 1320 and 1330-1 to 1330-M.

Referring to FIG. 13, a time-frequency resource is allocated by the DCI 1310. According to an embodiment, through a time-frequency allocated by one DCI 1310, the plurality of TBs 1320 and 1330-1 to 1330-M are transmitted. Herein, the plurality of TBs 1320 and 1330-1 to 1330-M include a first type TB 1320 and second type TBs 1330-1 to 1330-M.

Each of the first type TB 1320 and the second type TBs 1330-1 to 1330-M includes one MAC PDU. Herein, the first type TB 1320 includes a first type MAC PDU, and the second type TBs 1330-1 to 1330-M include second type MAC PDUs. Each of the second MAC PDUs may include data with a same or similar QoS requirement, for example, data of logical channels belonging to a same logical channel group (LCG). A first type MAC PDU also includes data with a same or similar QoS requirement, and according to an embodiment, includes decoding information 1322 (e.g., modulation order, coding technique, code rate) for each of the second type TBs 1330-1 to 1330-M and HARQ information 1324 (e.g., HARQ process number, new data indicator (NDI), redundancy version (RV)). Accordingly, it is possible to reduce the burden that the DCI 1310 should decoding information and HARQ information for all the plurality of TBs 1320 and 1330-1 to 1330-M, while making the plurality of TBs 1320 and 1330-1 to 1330-M to the one DCI 1310.

As shown in FIG. 13, multi-QoS data may be transmitted by one transport channel. Thus, at least some of transmission control information may be transmitted through a first type TB, not through DCI. As a first type TB is transmitted through a data transport channel such as PDSCH or PUSCH, it is easier to forward a larger amount of control information than a control channel like PDCCH. Additional use of a PDCCH resource may be minimized by including additional information necessary for transmitting new data together with retransmission data by a single HARQ process in the first type TB.

As shown in FIG. 13, two types of TBs and two types of MAC PDUs may be defined. In the case of FIG. 13, the expressions "first type" and "second type" are used to classify TBs or MAC PDUs, but "first type" and "second type" may refer to primary/secondary or other terms that are distinguished from each other.

Figure 14:
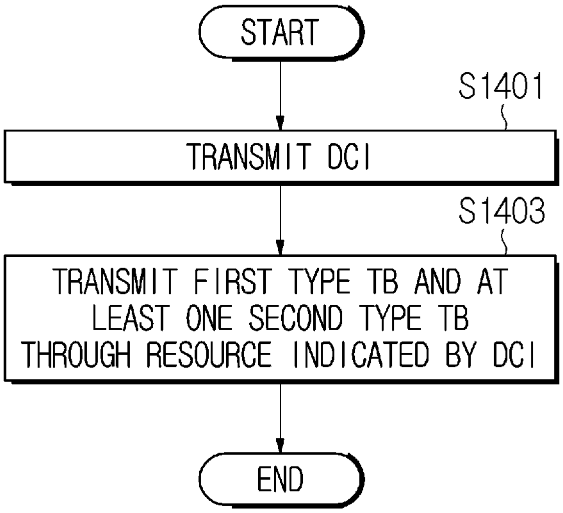
FIG. 14 illustrates an example of a procedure of transmitting data in a wireless communication system according to an embodiment of the present disclosure.

FIG. 14 illustrates an example of a procedure of transmitting data in a wireless communication system according to an embodiment of the present disclosure. FIG. 14 exemplifies a method performed by a base station.

Referring to FIG. 14, at step S1401, a base station transmits a DCI. The DCI includes resource allocation information for a plurality of TBs that are subsequently transmitted. According to an embodiment, the DCI may include decoding information (e.g., MCS level) for a first type TB among a plurality of TBs and HARQ information (e.g., at least one of HARQ PN, NDI, and RV). According to another embodiment, the DCI may further include a part of decoding information (e.g., modulation order) for a second type TB.

At step S1403, the base station may transmit a first type TB and at least one second type TB through a resource indicated by a DCI. Herein, the first type TB may include at least a part of decoding information (e.g., at least one of modulation order, coding technique, and code rate) for at least one second type TB and HARQ information (e.g., at least one of HARQ PN, NDI, and RV).

Figure 15:
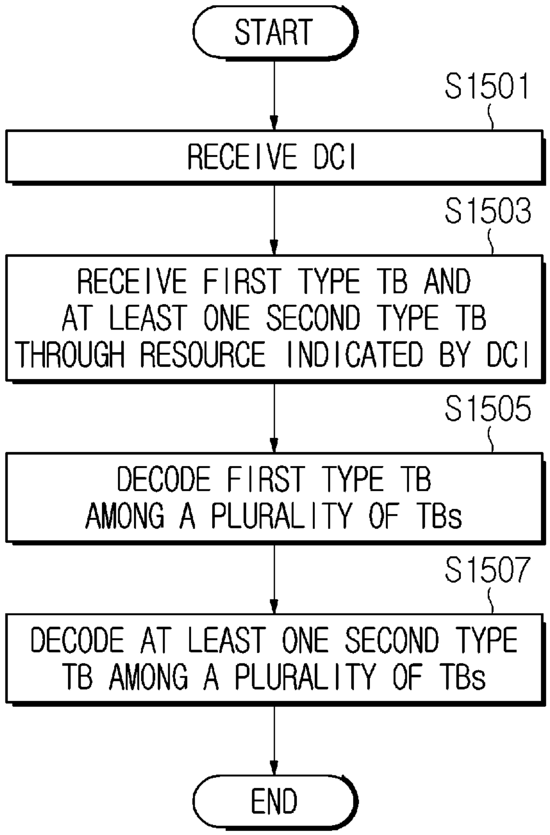
FIG. 15 illustrates an example of a procedure of receiving data in a wireless communication system according to an embodiment of the present disclosure.

FIG. 15 illustrates an example of a procedure of receiving data in a wireless communication system according to an embodiment of the present disclosure. FIG. 15 exemplifies a method performed by a terminal.

Referring to FIG. 15, at step S1501, a terminal receives a DCI. The DCI includes resource allocation information for a plurality of TBs that are subsequently received. According to an embodiment, the DCI may include decoding information (e.g., MCS level) for a first type TB among the plurality of TBs and HARQ information (e.g., at least one of HARQ PN, NDI, and RV). According to another embodiment, the DCI may further include a part of decoding information (e.g., modulation order) for a second type TB. Through the HARQ information, the terminal may identify whether the first type TB includes retransmission data and what is previously received data to be combined with the retransmission data. That is, the terminal may identify a HARQ process combined with the retransmission data in the first type TB based on the HARQ information and a RV necessary for combination.

At step S1503, the terminal receives a first type TB and at least one second type TB through a resource indicated by the DCI. Herein, the first type TB may include at least a part of decoding information (e.g., at least one of modulation order, coding technique, and code rate) for the at least one second type TB and HARQ information (e.g., at least one of HARQ PN, NDI, and RV).

At step S1505, the terminal decodes a first type TB among the plurality of TBs. The terminal may decode the first type TB based on control information in a DCI. In addition, the terminal may obtain control information about at least one second type TB in the first type TB, that is, decoding information and HARQ information. Herein, when the first type TB includes retransmission data, the terminal may combine previously received data associated with a same HARQ process and retransmission data and then perform decoding.

At step S1507, the terminal decodes at least one second type TB among the plurality of TBs. The terminal may decode the second type TB based on control information in the first type TB. Herein, when the second type TB includes retransmission data, the terminal combine previously received data associated with a same HARQ process and the retransmission data and then perform decoding. According to an embodiment, the terminal may refer to a HARQ process associated with data in the first type TB in order to determine a HARQ process associated with the retransmission data. That is, the terminal may identify a HARQ process associated with the retransmission data in the second type TB based on HARQ information for the first type TB in the DCI and HARQ information for the second type TB in the first type TB. According to another embodiment, the terminal may identify a HARQ process associated with retransmission data independently of a HARQ process associated with data in the first type TB.

The embodiments described with reference to FIG. 14 and FIG. 15 are related to operations of a base station and a terminal that perform downlink communication. Similarly, uplink communication may also include DCI transmission and a plurality of TBs transmission based on DCI. However, a DCI is transmitted by a base station, and a plurality of TBs are transmitted by a terminal. Specifically, a base station transmits a DCI including control information for a first type TB, and a terminal may transmit a first type TB and at least one second type TB based on the DCI to the base station. Herein, the DCI may not include decoding information for the at least one second type TB and HARQ information or may include a part thereof. At least a part of decoding information for the at least one second type TB and HARQ information not included in the DCI may be determined based on control information for the first type TB according to a predefined or pre-signaled rule.

According to the above-described examples, a plurality of TBs may be transmitted based on one DCI. For transmission according to various embodiments, a data structure of an MAC layer and a physical (PHY) layer may be newly defined.

A MAC layer may transmit one primary MAC PDU and zero or at least one secondary MAC PDU through a single transport channel (e.g., DL-SCH or UL-SCH). A TB corresponding to the primary MAC PDU is referred to as a primary TB (hereinafter 'PTB'), and the remaining TB is referred to as a secondary TB (hereinafter 'STB'). A PHY layer attaches a TB CRC to each TB. Each TB corresponds to one or more code block groups. Each code block group includes at least one code block. When a code block group includes a plurality of code blocks, a CRC may be added to each code block. A MAC/PHY data structure of the above-described structure may be as shown in FIG. 16A or FIG. 16B below.

Figure 16A:
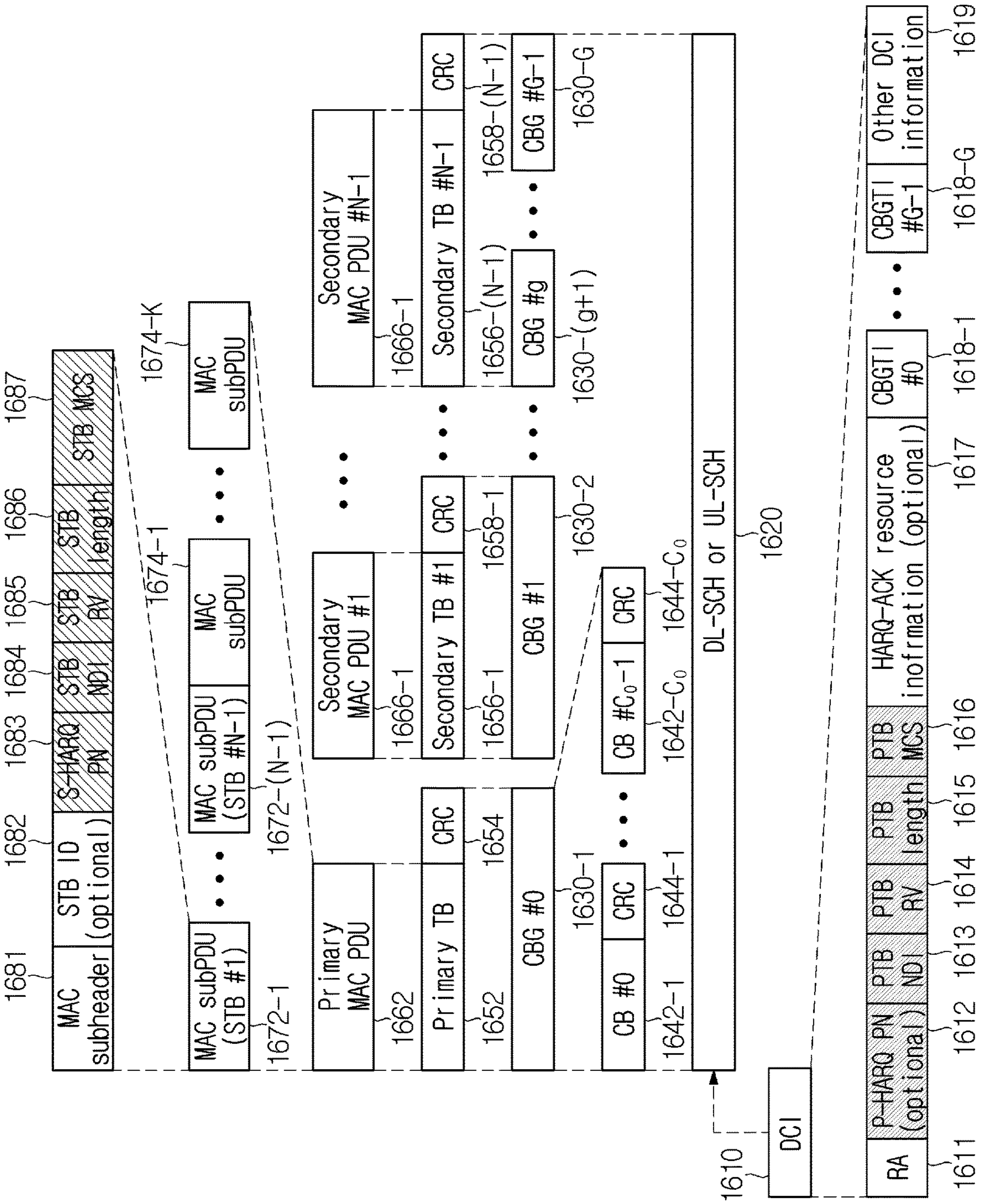
FIG. 16A and FIG. 16B illustrate an example of a media access control (MAC)/physical (PHY) data structure in a wireless communication system according to an embodiment of the present disclosure.
Figure 16B:
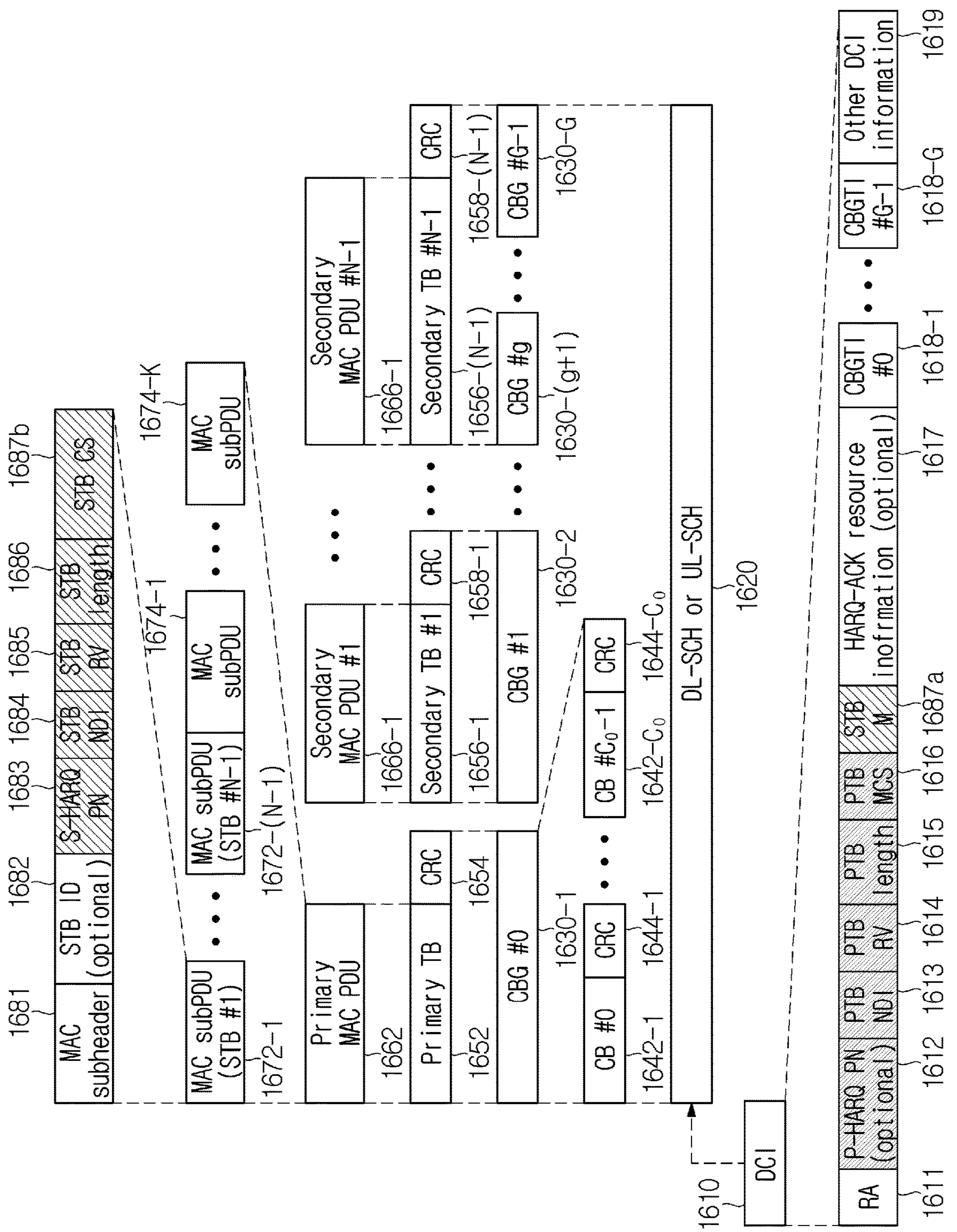

FIG. 16A and FIG. 16B illustrate an example of a MAC/PHY data structure in a wireless communication system according to an embodiment of the present disclosure. FIG. 16A exemplifies a structure where modulation orders of STBs may be set to be different from each other, and FIG. 16B exemplifies a structure where modulation orders of STBs are identically set.

FIG. 16A exemplifies a transport structure of a MAC layer and a PHY layer capable of supporting multi-QoS data transport as a pair of DCI and a transport channel. In FIG. 16A, a first type TB is referred to as PTB, and a second type TB is referred to as STB.

Referring to FIG. 16A, a DCI 1610 is associated with a shared channel (SCH) 1620 (e.g., DL-SCH or UL-SCH) transmitted through a resource indicated by the DCI 1610. The DCI 1610 includes fields such as resource allocation (RA) 1611, primary (P)-HARQ PN 1612, PTB NDI 1613, PTB RV 1614, PTB length 1615, PTB MCS 1616, HARQ-ACK resource information 1617, code block group transmission information (CBGTI) 1618-1 to 1618-G, and other DCI information 1619.

The RA 1611 indicates a location of a resource allocated for PDSCH or PUSCH for transmitting the SCH 1620. The P-HARQ PN 1612 include an identification number of a HARQ process associated with a PTB, that is, a HARQ process number. However, when a synchronous HARQ is used, the P-HARQ PN 1612 may be omitted. The PTB NDI 1613 indicates whether data in the PTB 1652 is retransmission data or initially transmitted data. The PTB RV 1614 indicates a RV of data in the PTB 1652.

The PTB length 1615 indicates a length of a PTB included in the SCH 1620. The PTB MCS 1616 indicates a modulation order of the PTB 1652, a coding technique, and a code rate, which are included in the SCH 1620. According to another embodiment, a base station may forward some of a modulation order, a coding technique, and a code rate, which are applied to the PTB 1652, as a RRC message or MAC CE, not as the DCI 1610, to a terminal. For example, according to a channel state or a combination of supported services, a channel coding algorithm may be forwarded as a RRC message or MAC CE, and only a modulation order and a code rate may be forwarded as the DCI 1610.

The HARQ-ACK resource information 1617 indicates a location of a resource for ACK/NACK transmission corresponding to at least one TB included in the SCH 1620 and may be omitted in some cases. In other words, the HARQ-ACK resource information 1617 indicates a radio resource for forwarding HARQ-ACK information of the PTB 1652 and the STBs 1656-1 to 1656-(N 1). HARQ-ACK for the PTB 1652 and HARQ-ACKs for the STBs 1656-1 to 1656-(N-1) may be transmitted using different radio resources. For example, in case of a downlink, a PTB HARQ-ACK may be first transmitted through an TTI earlier than a STB HARQ-ACK. When no explicit HARQ-ACK is needed like in an uplink of 5G NR, HARQ-ACK resource information may not be transmitted. Alternatively, for example, a location of a resource for ACK/NACK transmission may be indicated by separate signaling, not the DCI 1610, and in this case, the HARQ-ACK resource information 1617 may be omitted. Each of CBGTI 1618-1 to 1618-G indicates whether a corresponding CBG is present in a corresponding location of the SCH 1620.

The SCH 1620 includes a plurality of CBGs 1630-1 to 1630-G, and CBG #0 1630-1 includes a plurality of CBs 1642-1 to 1642-$C_0$ and CRCs 1644 to 1644-$C_0$ therefor. The remaining CBGs 1630-2 to 1630-G may have a similar structure to CBG #0 1630-1. The CBGs 1630-1 to 1630-G are divided into a plurality of CBG groups including one or more CBGs, and one CBG group includes one PTB or one STB.

In the case of the example of FIG. 16A, CBG #0 1630-1 includes the PTB 1652 and a CRC 1654 for the PTB 1652, and CBG #1 1630-2 include STB #1 1656-1 and a CRC 1658-1 for STB #1 1656-1. In addition, CBG #g 1630-(g+1) to CBG #G-1 1630-G include STB #N-1 1656-(N-1) and a CRC 1658-(N-1) for STB #N-1 1656-(N-1). The PTB 1652 includes a primary MAC PDU 1662. A plurality of STBs 1656-1 to 1656-(N-1) include secondary MAC PUDs 1666-1 to 1666-(N-1), respectively.

The primary MAC PDU 1662 includes MAC subPDUs 1672-1 to 1672-(N-1) for the STBs 1656-1 to 1656-(N-1) and the remaining MAC subPDUs 1674-1 to 1674-K. Each of the remaining MAC subPDUs 1674-1 to 1674-K may include MAC CE or MAC SDU or padding, other than control information for the STBs 1656-1 to 1656-(N-1). Each of the MAC subPDUs 1672-1 to 1672-(N-1) for STBs includes control information for a corresponding STB. Control information for a STB is transmitted in a form of an MAC subPDU of the PTB 1652. The MAC subPDUs 1672-1 to 1672-(N-1) including control information for a STB may be distinguished from other MAC subPDUs 1674-1 to 1674-K by a logical channel ID.

For example, the MAC subPDU 1672-1 for STB #1 1656-1 includes a MAC subheader 1681, a STB ID 1682, a secondary (S)-HARQ PN 1683, a STB NDI 1684, a STB RV 1685, a STB length 1686, and a STB MCS 1687. Herein, the STB ID 1682 may be omitted. The MAC subheader 1681 includes a LCID. According to an embodiment, an LCID is set to a value which is allocated to indicate control information for a STB. The STB ID 1682 includes an ID value corresponding to each STB. According to an embodiment, when the MAC subPDUs 1672-1 to 1672-(N-1) including control information for a STB included in the PTB 1652 and the number and order of STBs corresponding thereto are always defined to identical with each other, the STB ID 1682 may be omitted.

The S-HARQ PN 1683 includes a HARQ process number associated with STB #1 1656-1. The STB NDI 1684 indicates whether data in STB #1 1656-1 is retransmission data or initially transmitted data. The STB RV 1685 indicates a RV of data in STB #1 1656-1. The STB length 1686 indicates a size of STB #1 1656-1 in bytes. The STB MCS 1687 includes a modulation order, a coding technique, and a code rate which are applied to CBG #1 1630-2 including STB #1 1656-1. Similar to the MAC subPDU 1672-1, a MAC subPDU for an STB other than STB #1 1656-1 may include a MAC subheader, a STB ID, a S-HARQ PN, a STB NDI, a STB RV, a STB length, and a STB MCS.

In FIG. 16A, a MAC subPDU including control information for each STB includes a MCS of the STB. That is, the structure exemplified in FIG. 16A supports setting a different modulation order for each STB. When no different modulation order for each STB is permitted, the structure as shown in FIG. 16B may be adopted. FIG. 16B exemplifies a MCS of an STB, that is, a structure where a modulation order is transmitted by DCI and a coding technique is transmitted by a MAC subPDU of the PTB. Referring to FIG. 16B, compared with the example of FIG. 16A, the DCI 1610 further includes STB modulation (M) 1687*a* that indicates a modulation order of STBs transmitted. In addition, the MAC subPDU 1672-1 for STB #1 1656-1 includes the MAC subheader 1681, the STB ID 1682, the S-HARQ PN 1683, the STB NDI 1684, the STB RV 1685, and the STB length 1686, and instead of the STB MCS 1687, further includes a STB coding scheme (CS) 1687*b* indicating a coding technique and a code rate of STB #1 1656-1. Similar to the MAC subPDU 1672-1, a MAC subPDU for a STB other than STB #1 1656-1 may also include a MAC subheader, a STB ID, a S-HARQ PN, a STB NDI, a STB RV, a STB length, and a STB CS.

As described above, when a plurality of TBs are associated with one DCI, there may be a change in a HARQ procedure. For example, if an error occurs to a first type TB, there is a problem in that decoding of a second type TB cannot be performed until the error of the first type TB is corrected through retransmission. Accordingly, it is desirable that a target BLER of a first type TB is set to be low. However, since no error can be perfectly prevented, a method of minimizing decoding latency for a second type TB during occurrence of an error is needed. According to an embodiment, by differentiating HARQ-ACK transmission times of a first type TB and a second type TB, transmission latency may be reduced. A retransmission procedure according to an embodiment is shown in FIG. 17 below.

Figure 17:
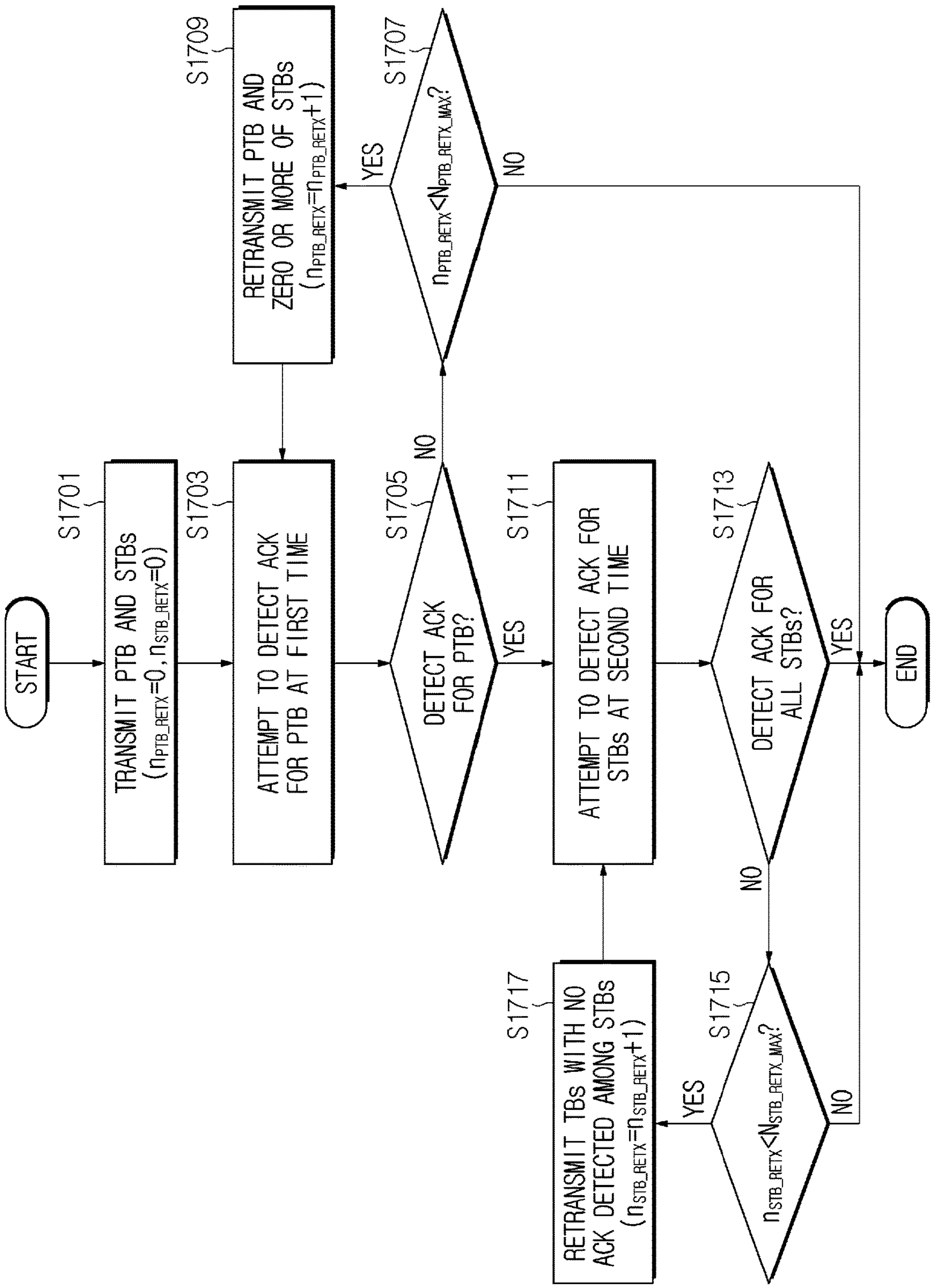
FIG. 17 is a view showing another example of a method for retransmitting a transport block according to an embodiment of the present disclosure.

FIG. 17 is a view showing another example of a method for retransmitting a transport block according to an embodiment of the present disclosure. FIG. 17 exemplifies a method performed by a device transmitting data, and an operating subject is referred to as 'device'. The device may be understood as a base station in downlink communication and a terminal in uplink communication.

Referring to FIG. 17, at step S1701, a device transmits a PTB and a STB. That is, the device initially transmits the PTB and the STB. During the initial transmission, the number of retransmissions of PTB (hereinafter '$n_{PTB\_RETX}$') is initialized to 0, and the number of retransmissions of STB (hereinafter '$n_{STB\_RETX}$') is initialized to 0. Before this, although not shown in FIG. 17, the device may transmit or receive a DCI.

At step S1703, the device attempts to detect an ACK for a PTB at a first time. ACK timing for detecting the ACK may be predefined or set through separate signaling. According to various embodiments, the first time may be earlier than a time where transmission of STBs is completed, or later than a time where transmission of STBs is completed, and may be earlier than ACK timing for STBs by at least one TTI. At step S1705, the device checks whether an ACK for the PTB is detected. That is, the device determines whether decoding of the PTB has been successful in a counterpart device.

If the ACK for the PTB is not detected, at step S1707, the device determines whether $n_{PTB\_RETX}$ is less than a maximum number of retransmission of the PTB (hereinafter '$N_{PTB\_RETX\_MAX}$'). If $n_{PTB\_RETX}$ is equal to or greater than $N_{PTB\_RETX\_MAX}$, the device terminates this procedure. On the other hand, if $n_{PTB\_RETX}$ is less than $N_{PTB\_RETX\_MAX}$, at step S1709, the device retransmits the PTB and 0 or more STBs. Herein, $n_{PTB\_RETX}$ is increased by 1. Next, the device returns to step S1703.

On the other hand, if the ACK for the PTB is detected, at step S1711, the device attempts to detect ACKs for initially transmitted STBs at a second time. ACK timing for attempting to detect the ACKs may be predefined or set through separate signaling. At step S1713, the device checks whether ACKs for all STBs are detected. In other words, the device checks whether ACKs for all the STBs transmitted at step S1701 are detected. That is, the device determines whether decoding of the STBs was successful in a counterpart device. In case a plurality of STBs are transmitted, decoding of some of the STBs may be successful, and decoding of the remaining ones may fail. If ACKs for all the STBs are detected, the device terminates this procedure.

On the other hand, if an ACK for at least one of the STBs is not detected, at step S1715, the device determines whether $n_{STB\_RETX}$ is less than a maximum number of retransmissions (hereinafter '$N_{STB\_RETX\_MAX}$') of STB. If $n_{STB\_RETX}$ is equal to or greater than $N_{STB\_RETX\_MAX}$, the device terminates this procedure. On the other hand, if $n_{STB\_RETX}$ is less than $N_{STB\_RETX\_MAX}$, at step S1717, the device retransmits at least one STB with no ACK being detected among the STBs. Next, the device returns to step S1711.

In the description referring to FIG. 17, a plurality of STBs are described to be transmitted. However, according to another embodiment, the procedure of FIG. 17 may be applied to a case where one STB is transmitted.

In an embodiment described with reference to FIG. 17, a same maximum number of retransmissions is applied to a plurality of STBs. However, according to another embodiment, a plurality of STBs may be classified into a plurality of groups, and different maximum numbers of retransmissions may be applied according to each group. That is, according to a QoS requirement of a TB group, multiple maximum numbers of retransmissions may be applied.

Hereinafter, more concrete examples of HARQ procedure will be described with reference to FIG. 18 to FIG. 22. FIG. 18 to FIG. 22 exemplify situations where multi-QoS DL-SCHs are transmitted when HARQ-ACK feedback time is separated between a PTB and a STB.

Figure 18:
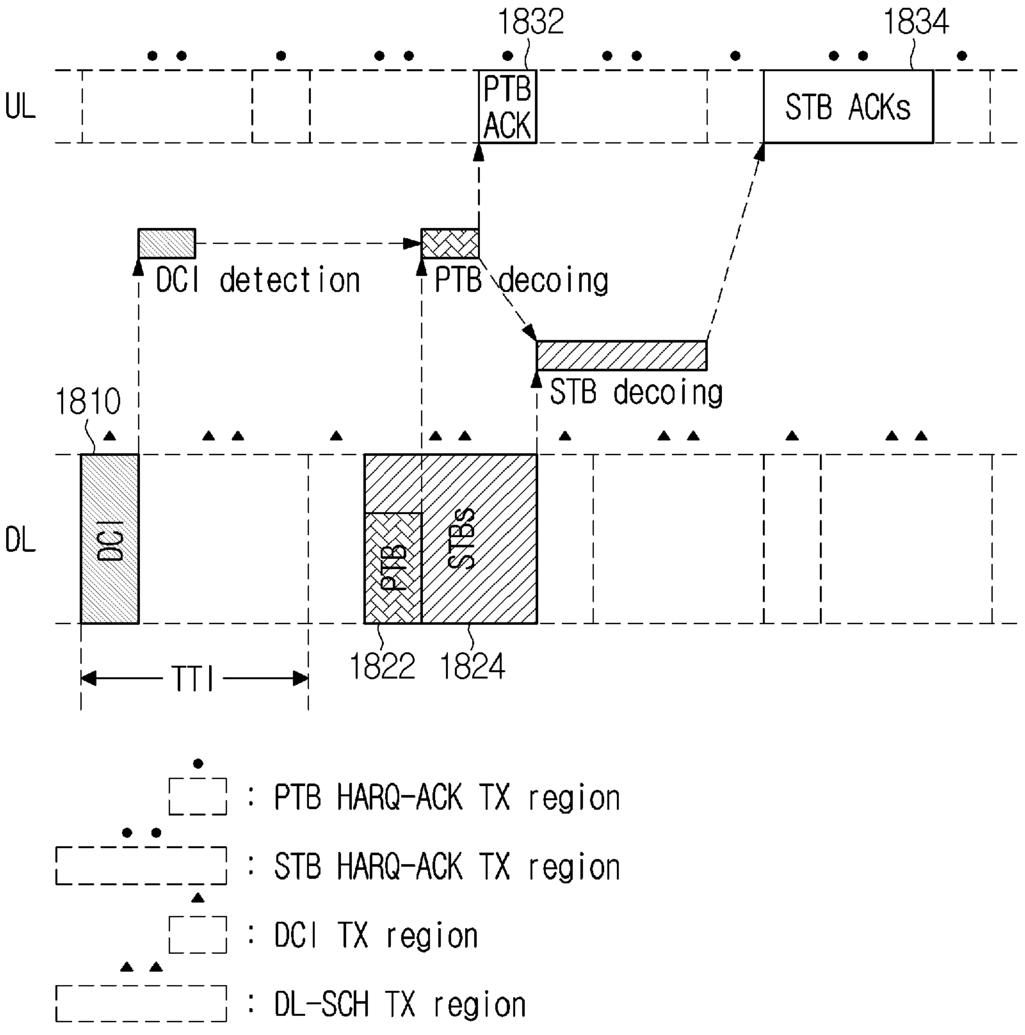
FIG. 18 is a view showing an example of transmission of transport blocks without decoding failure according to an embodiment of the present disclosure.

FIG. 18 is a view showing an example of transmission of transport blocks without decoding failure according to an embodiment of the present disclosure. FIG. 18 exemplifies a case where a NACK does not occur and both a DCI and a PTB are successfully decoded in a first transmission of multi-QoS DL-SCH. Referring to FIG. 18, a DCI 1810 is successfully detected, and a DL-SCH including a PTB 1822 and STBs 1824 is transmitted in a predetermined time offset (e.g., 1 TTI) after the transmission of the DCI 1810. The DCI 1810 and the time offset of the DL-SCH may be predetermined by a specification, set by a higher message such as a RRC, or forwarded through scheduling information within the DCI. After obtaining DL-SCH scheduling and control information and PTB transmission control information by successfully detecting the DCI 1810, a terminal receives the DL-SCH and attempts to decode the PTB 1822. When successfully decoding the PTB 1822, a HARQ ACK 1832 for the PTB 1822 is transmitted. Then, the terminal attempts to decode the STBs 1824. In the case of FIG. 18, decoding of the STBs 1824 is successful. Accordingly, the terminal transmits HARQ ACKs 1834 indicating a decoding result for the STBs 1824 to a base station. As shown in FIG. 18, HARQ-ACKs for an entire DL-SCH may not be transmitted at a same time, but a HARQ-ACK for the PTB 1822 may be transmitted first. An offset of a transmission time of a HARQ-ACK for the PTB 1822 and the STBs 1824 may be predetermined by a specification, set by a higher message such as a RRC, or forwarded through HARQ-ACK transport resource information in a DCI.

Figure 19:
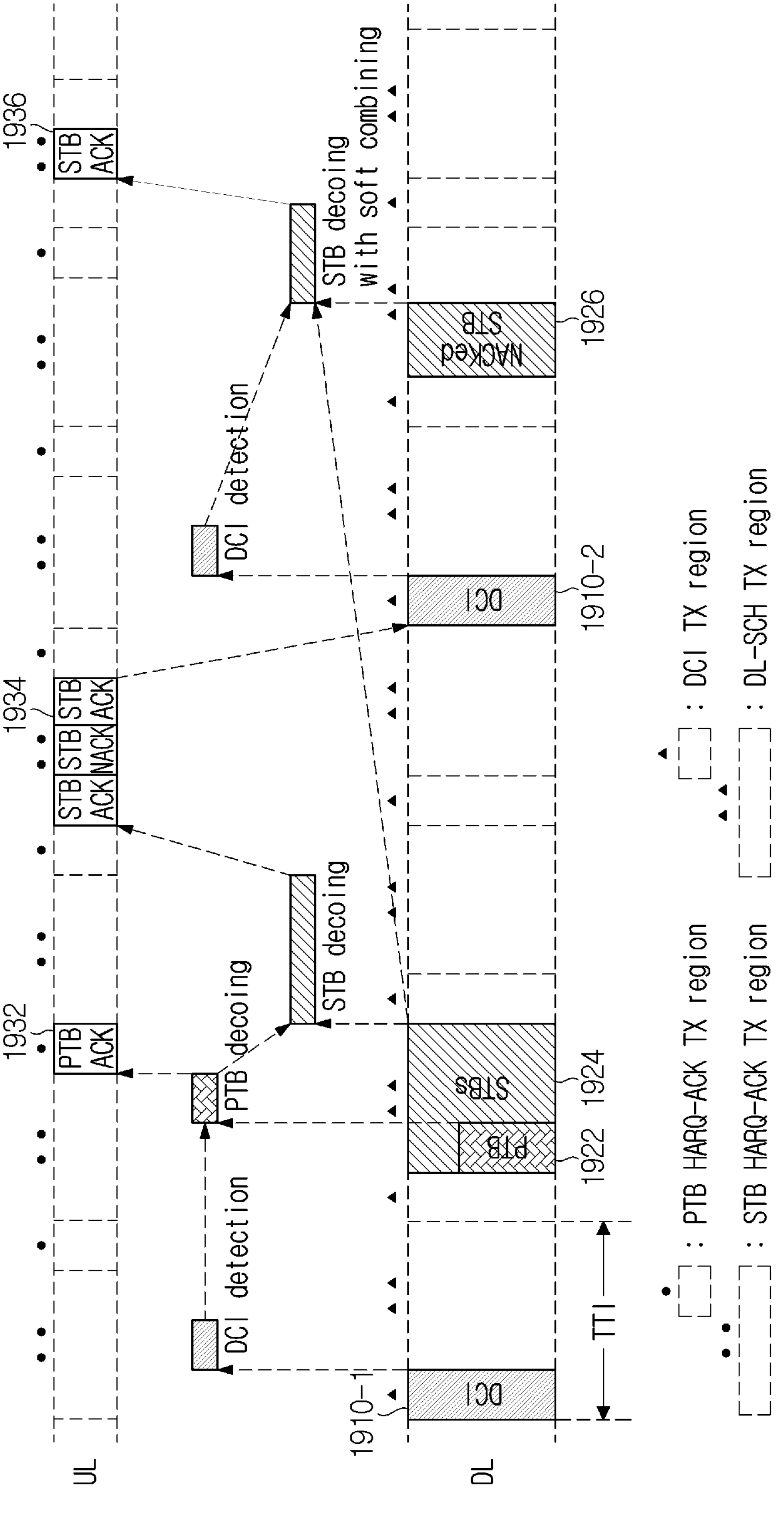
FIG. 19 is a view showing an example of transmission of transport blocks when decoding of a second type transport block fails according to an embodiment of the present disclosure.

FIG. 19 is a view showing an example of transmission of transport blocks when decoding of a STB fails according to an embodiment of the present disclosure. FIG. 19 exemplifies a case where both a DCI and a PTB are successfully decoded in a first transmission of a multi-QoS DL-SCH, but decoding of one of STBs fails. Referring to FIG. 19, a DCI 1910-1 is successfully detected, a PTB 1922 is successfully decoded, and a HARQ ACK 1932 for the PTB 1922 is transmitted. Then, a terminal attempts to decode STBs 1924. In the case of FIG. 19, decoding of at least one of the STBs 1924 fails. Accordingly, the terminal transmits a HARQ ACK/NACK 1934 indicating a decoding result for the STBs 1924 to a base station. Accordingly, a DCI 1910-2 for retransmitting a CBG corresponding to a STB, for which decoding fails, is transmitted, and a STB 1926, for which decoding fails, is retransmitted. Herein, decoding of the STB 1926 is successful, and a HARQ ACK 1936 indicating the success of decoding of the STB 1926 is transmitted.

Figure 20:
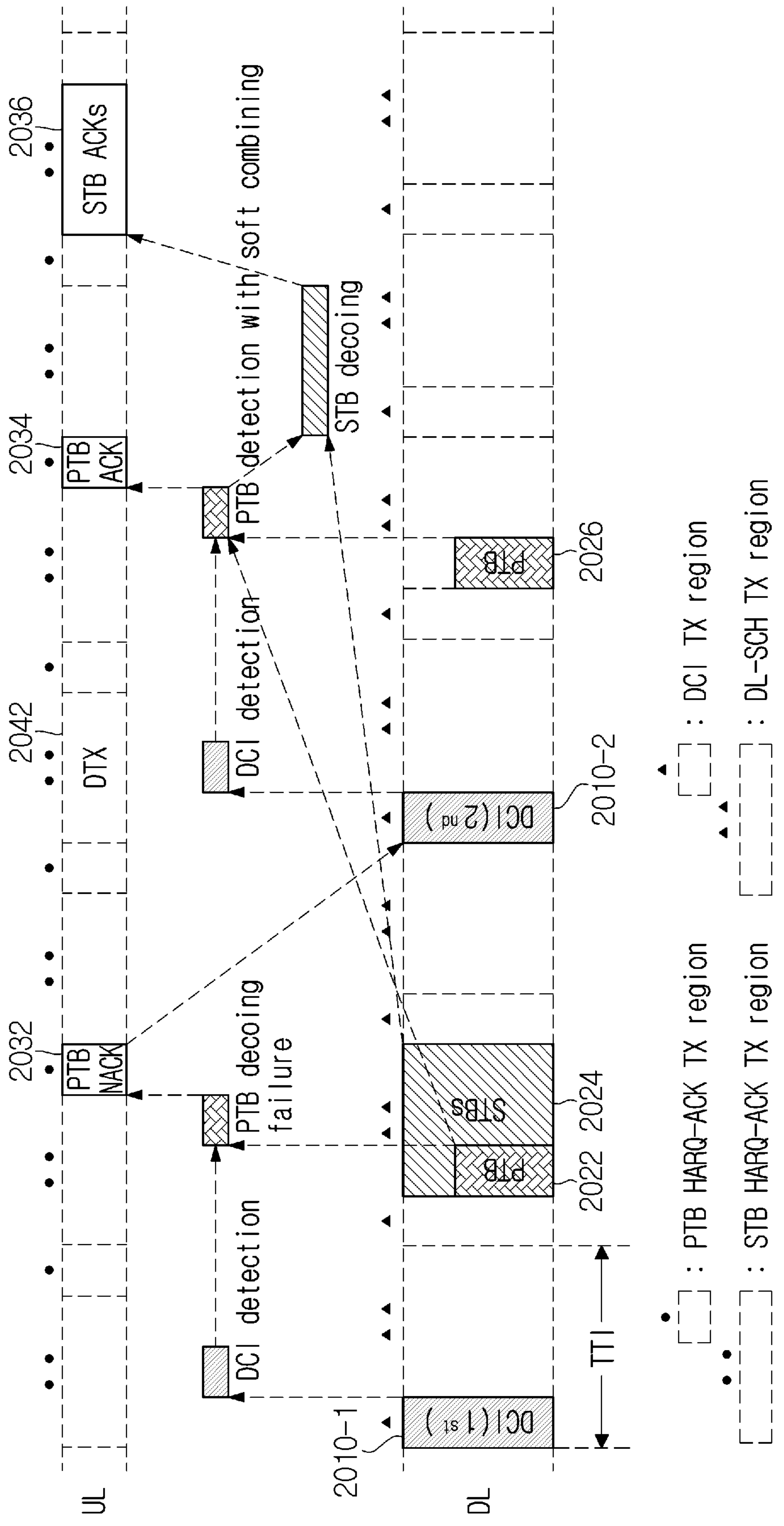
FIG. 20 is a view showing an example of transmission of transport blocks when decoding of a first type transport block fails according to an embodiment of the present disclosure.

FIG. 20 is a view showing an example of transmission of transport blocks when decoding of a PTB fails according to an embodiment of the present disclosure. FIG. 20 exemplifies a case where a DCI is successfully decoded in a first transmission of a multi-QoS DL-SCH, but decoding of a PTB fails. Referring to 20, a DCI 2010-1 is successfully detected, and decoding of a PTB 2022 is attempted. However, as decoding of the PTB 2022 fails, a HARQ NACK 2032 for the PTB 2022 is transmitted. Accordingly, a terminal receives STBs 2024 but cannot demodulate and decode them. If modulation order information of the STBs 2024 is included in the DCI 2010-1, the terminal may demodulate the STBs 2024 but cannot decode them. A base station, which detects the HARQ NACK 2032 for the PTB 2022, transmits a DCI 2022-1 for retransmission and then retransmits a PTB 2026. In this case, the terminal combines the PTB 2022 and the PTB 2026 (e.g., soft combining) and attempts decoding again. When decoding of the PTBs 2022 and 2026 is successful, the terminal performs decoding of the STBs 2024 based on a previously received signal.

Figure 21:
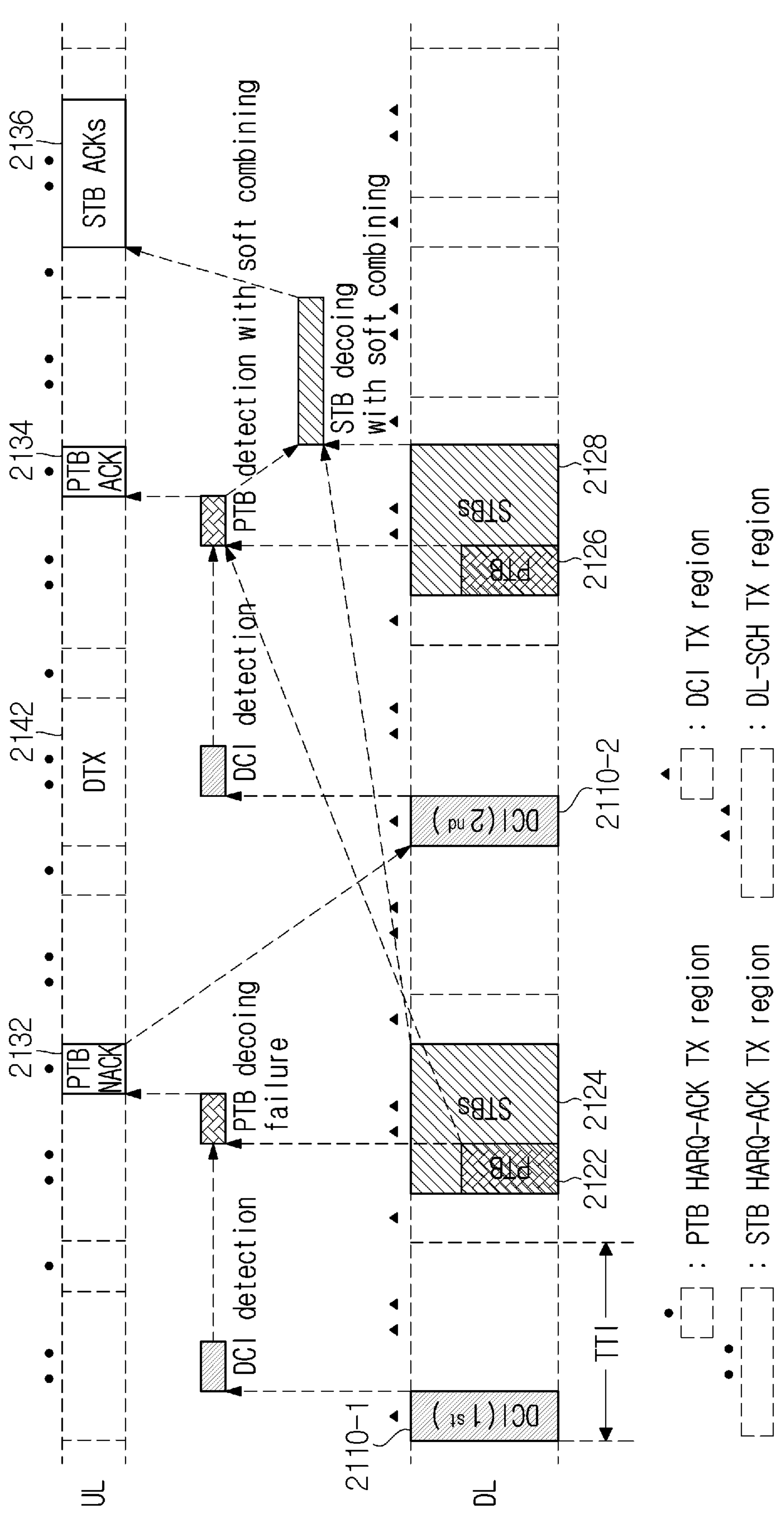
FIG. 21 is a view showing another example of transmission of transport blocks when decoding of a first type transport block fails according to an embodiment of the present disclosure.

FIG. 21 is a view showing another example of transmission of transport blocks when decoding of a PTB fails according to an embodiment of the present disclosure. FIG. 21 exemplifies a case where a DCI is successfully decoded in a first transmission of a multi-QoS DL-SCH, but decoding of a PTB fails. Referring to FIG. 21, a DCI 2110-1 is successfully detected, and decoding of a PTB 2122 is attempted. However, as decoding of the PTB 2122 fails, a HARQ NACK 2132 for the PTB 2122 is transmitted. Accordingly, a terminal receives STBs 2124 but cannot demodulate and decode them. If modulation order information of the STBs 2124 is included in the DCI 2110-1, the terminal may demodulate the STBs 2124 but cannot decode them. A base station, which detects the HARQ NACK 2132 for the PTB 2122, transmits a DCI 2110-2 for retransmission and then retransmits a PTB 2127 and STBs 2128. In this case, the terminal combines the PTB 2122 and the PTB 2127 (e.g., soft combining) and attempts decoding again. When decoding of the PTBs 2122 and 2726 is successful, the terminal combines the STBs 2124 and the STBs 2128, which are previously received, and performs decoding. Unlike the example of FIG. 20, STBs are also retransmitted. In the case of the example of FIG. 21, a resource necessary for retransmission increases, but a decoding success rate of a STB becomes higher, and thus the possibility of further retransmission and transmission latency may be reduced.

In case decoding of a PTB fails, a terminal may transmit a HARQ-NACK for a STB or process it as DTX. As shown in FIG. 20 and FIG. 21, when decoding of a PTB fails, if a terminal processes HARQ feedback of a STB as DTX, a base station may have one more chance of retransmitting a PTB after erroneously detecting a PTB-NACK or a PTB-DTX as ACK and recognizing false detection. Whether the terminal will transmit a HARQ-NACK or perform DTX processing may be set by the base station through a RRC message.

Figure 22:
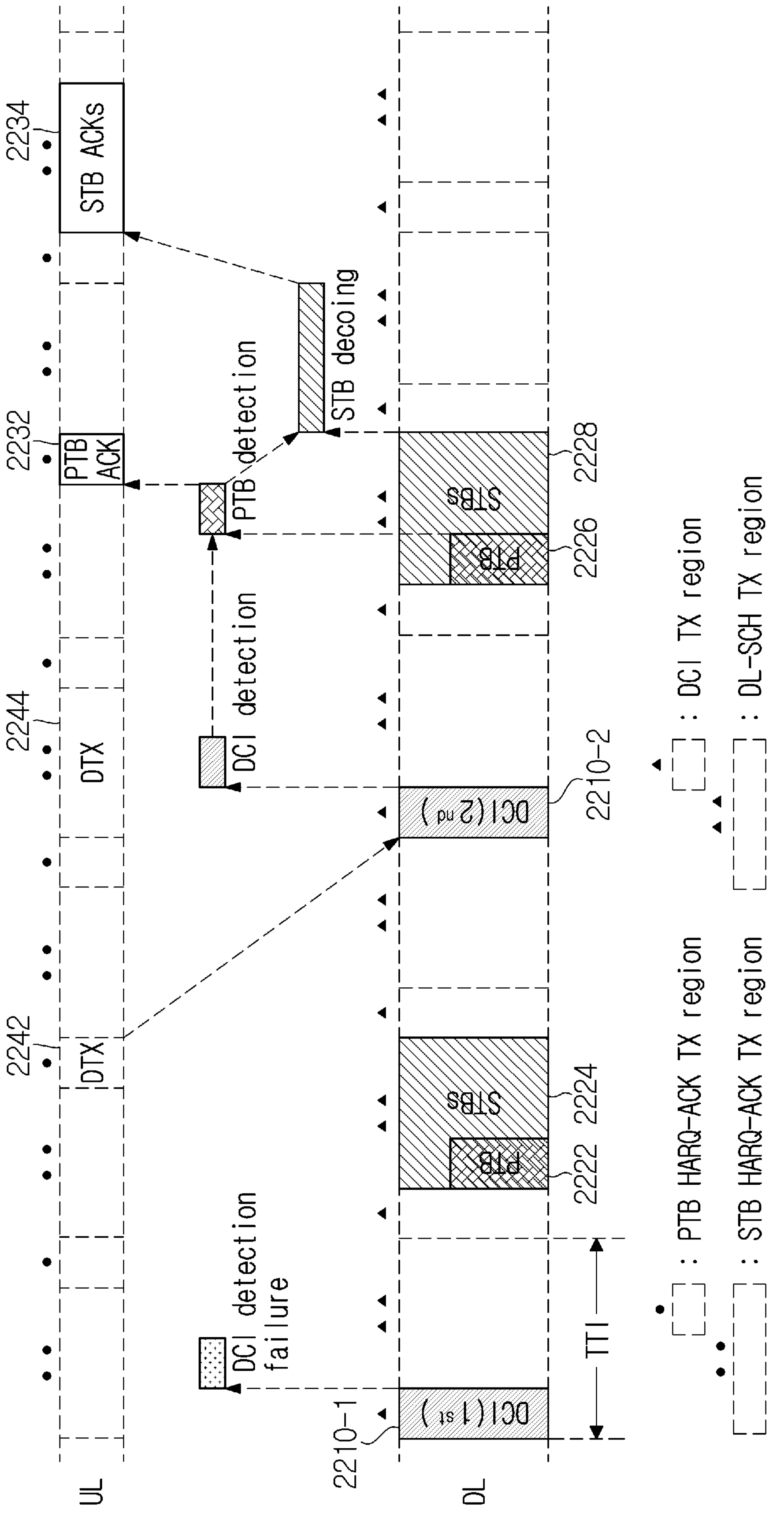
FIG. 22 is a view showing an example of transmission of transport blocks when detection of control information fails according to an embodiment of the present disclosure.

FIG. 22 is a view showing an example of transmission of transport blocks when detection of control information fails according to an embodiment of the present disclosure. FIG. 22 exemplifies a case where decoding of a DCI fails in a first transmission of a multi-QoS DL-SCH. Referring to 22, detection of a DCI 2210-1 fails. As a terminal fails to detect the DCI 2210-1, the terminal does not transmit a HARQ-ACK for a PTB 2222, and a base station recognizes HARQ feedback on the PTB 2222 as DTX 2242. In addition, the terminal also processes HARQ feedback on STBs 2224 as the DTX 2242. In this case, the base station retransmits the entire DL-SCH, that is, both a PTB 2226 and STBs 2228. In the example of FIG. 22, decoding of the retransmitted PTB 2226 and STBs 2228 is successful, and a PTB ACK 2232 and STB ACKs are transmitted.

Like in FIG. 22, since a transmission time of a PTB HARQ-ACK is quicker than a STB HARQ-ACK, DCI reception failure of a terminal may be recognized earlier in a base station, and retransmission may be performed. Accordingly, retransmission latency may be reduced.

As described above, retransmission according to transmission error of a PTB and a STB may be performed in various ways. In order to manage retransmission, effective operation of a HARQ process is required. Hereinafter, various embodiments of HARQ process operation based on the above-described data structure will be described. As HARQ information for a PTB is all forwarded through a DCI, the present disclosure will mainly describe a HARQ process associated with a STB (hereinafter referred to as 'S-HARQ process') below.

According to various embodiments, some schemes for operating a S-HARQ process may be defined. For example, it is possible to apply a dedicated S-HARQ operation scheme, which operates a S-HARQ process according to each P-HARQ process, or a shared S-HARQ process operation scheme where every S-HARQ process can be used in every P-HARQ process.

A dedicated S-HARQ process operation scheme according to an embodiment is a scheme where a dedicated S-HARQ process is operated for each P-HARQ process. If the number of P-HARQ processes is $N_{P\text{-}HARQ}$ and the number of S-HARQ processes is $N_{S\text{-}HARQ}$, a P-HARQ PN may be set to one of the values 0 to $N_{P\text{-}HARQ}-1$, and a S-HARQ PN may be set to one of the values 0 to $N_{S\text{-}HARQ}-1$, and a total number of HARQ processes, which can occur, is $N_{P\text{-}HARQ} \times N_{S\text{-}HARQ}$.

According to the dedicated S-HARQ process operation scheme, a HARQ process of a PTB or a HARQ process of a STB is identified by a combination of a P-HARQ PN and a S-HARQ PN. That is, in the dedicated S-HARQ process operation scheme, a HARQ process of a STB is subject to a HARQ process of a PTB. According to an embodiment, a HARQ process of a PTB or a STB may be identified by a pair of a P-HARQ PN and a S-HARQ PN $\{n_{P\text{-}HARQ}, n_{S\text{-}HARQ}\}$. In a HARQ PN pair specifying a PTB, a S-HARQ PN is always fixed to 0. In a HARQ PN pair specifying a STB, a S-HARQ PN may be set to one of the values 1 to $N_{S\text{-}HARQ}$-1. For example, in a TTI where a P-HARQ PN is $n_{P\text{-}HARQ}$, since a PTB is $\{n_{P\text{-}HARQ}, 0\}$, STBs may be indicated by $\{n_{P\text{-}HARQ}, 1\}$, $\{n_{P\text{-}HARQ}, 2\}$, . . . , $\{n_{P\text{-}HARQ}, N_{S\text{-}HARQ}-1\}$. According to another embodiment, a HARQ process of a PTB or a STB may be identified by a unique single process number (e.g., $N_{P\text{-}HARQ*nP\text{-}HARQ}+n_{S\text{-}HARQ}$) based on a P-HARQ PN and a S-HARQ PN.

Figure 23:
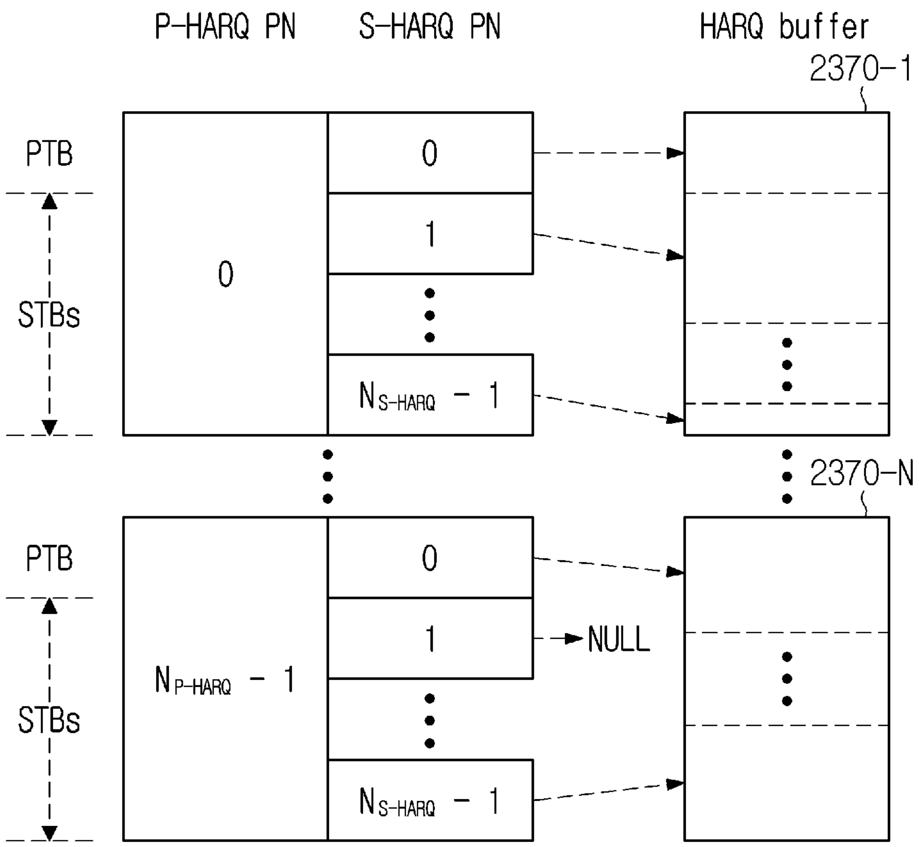
FIG. 23 illustrates an example of buffer allocation based on a dedicated secondary (S)-hybrid automatic repeat request (HARQ) process operation scheme in a wireless communication system according to an embodiment of the present disclosure.

FIG. 23 illustrates an example of buffer allocation based on a dedicated secondary (S)-hybrid automatic repeat request (HARQ) process operation scheme in a wireless communication system according to an embodiment of the present disclosure. FIG. 23 is an example of a dedicated S-HARQ process operation scheme, exemplifying a relationship among a PTB, a STB, a P-HARQ PN, a S-HARQ PN, and a HARQ buffer (e.g., circular buffer of a transmitter, a soft buffer of a receiver).

Referring to FIG. 23, a HARQ buffer may be divided into a first sub-buffer 2370-1 to a n-th sub-buffer 2370-N, and each of the sub-buffers 2370-1 to 2370-N may be allocated to a single P-HARQ PN. Each of the sub-buffers 2370-1 to 2370-N may be divided into a plurality of regions according to a data size and a code rate which are transmitted through a S-HARQ process, and each of the regions may be managed by each S-HARQ process. As a PTB associated with S-HARQ PN '0' and a size and a code rate of STBs associated with the remaining S-HARQ PN are variable, the size of each S-HARQ process buffer may be dynamically different. As a dedicated S-HARQ process operation method can dynamically manage a S-HARQ process buffer only within each P-HARQ process buffer, the complexity of buffer operation may be lowered.

Figure 24:
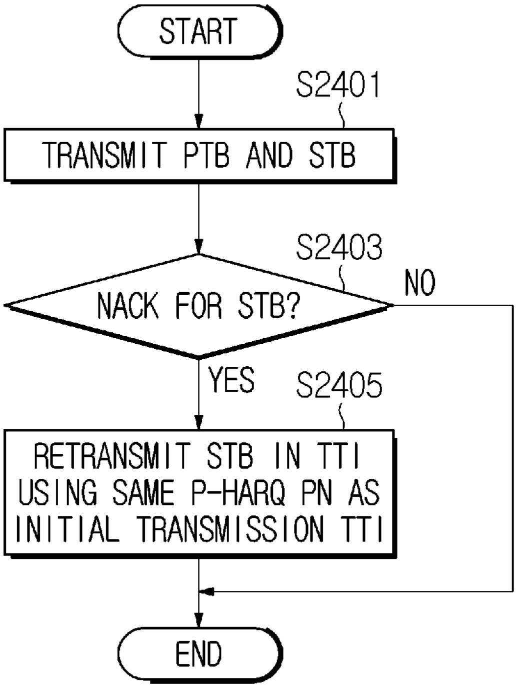
FIG. 24 illustrates an example of a procedure of retransmitting a secondary transport block (STB) based on a dedicated S-HARQ process operation scheme in a wireless communication system according to an embodiment of the present disclosure.

FIG. 24 illustrates an example of a procedure of retransmitting a secondary transport block (STB) based on a dedicated S-HARQ process operation scheme in a wireless communication system according to an embodiment of the present disclosure. FIG. 24 exemplifies an operating method of a device transmitting data, and an operating subject is referred to as 'device'. A device may be understood as a base station in downlink communication and a terminal in uplink communication.

Referring to FIG. 24, at step S2401, a device transmits a PTB and a STB. When the device is a base station, the device may transmit a DCI and receive a PTB and a STB through a resource indicated by the DCI. When the device is a terminal, the device may receive a DCI and transmit a PTB and a STB through a resource indicated by the DCI.

At step S2403, the device checks whether a NACK occurs for a STB. That is, the device checks whether decoding of the STB fails in a counterpart device and whether retransmission of the STB is requested. Herein, the occurrence of the NACK may be identified by explicit signaling or be determined based on no ACK being received.

At step S2405, the device retransmits a STB in a TTI where a same P-HARQ PN as in a TTI of initial transmission is used. That is, the device retransmits the STB through a resource indicated by a DCI including a P-HARQ process number set to a same number as a P-HARQ process number associated with initial transmission of the STB for which retransmission is required. This is because, as a HARQ process of a STB is subject to a HARQ process of a PTB, retransmission of the STB is permitted only in a TTI where a same P-HARQ PN as a P-HARQ PN of initial transmission is applied.

Figure 25:
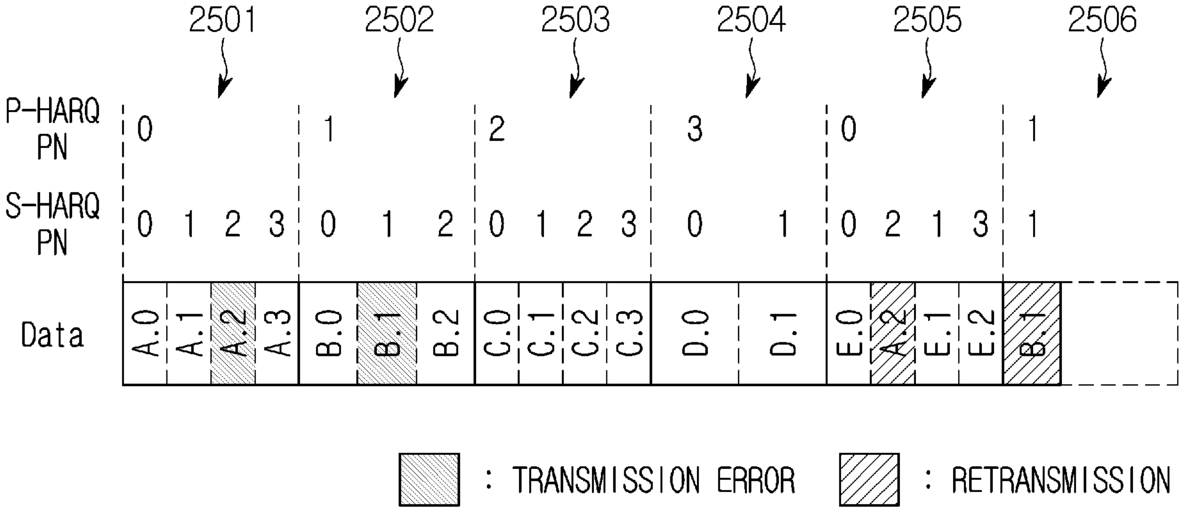
FIG. 25 illustrates an example of STB retransmission based on a dedicated S-HARQ process operation scheme in a wireless communication system according to an embodiment of the present disclosure.

FIG. 25 illustrates an example of STB retransmission based on a dedicated S-HARQ process operation scheme in a wireless communication system according to an embodiment of the present disclosure. FIG. 25 exemplifies a case where retransmission of a STB occurs in a dedicated S-HARQ process operation scheme in which $N_{P\text{-}HARQ}$ is 4 and $N_{S\text{-}HARQ}$ is 4. In FIG. 25, A.0, B.0, C.0, D.0, and E.0 are PTBs, and the remaining ones are STBs.

Referring to FIG. 25, A.2 transmitted in a first TTI 2501 and B.1 transmitted in a second TTI 2502 are subject to a transmission error. Accordingly, A.2 and B.1 are retransmitted. In the example of FIG. 25, it is assumed that there is a situation in which there is new data to be transmitted together in a TTI 2505 for retransmitting A.2 and there is no new data to be transmitted together in a TTI 2506 for retransmitting B.1. Herein, A.2 is retransmitted together with new TBs in the fifth TTI 2505 transmitted later as a same P-HARQ PN. B.1 is not retransmitted together with new data but is solely retransmitted in a sixth TTI 2506. In the sixth TTI 2506, no PTB is transmitted. According to the dedicated S-HARQ process operation scheme, as in FIG. 25, retransmission of STBs is performed so that a P-HARQ PN and a S-HARQ PN are the same as those of initial transmission.

A shared S-HARQ process operation scheme according to an embodiment is a scheme of a S-HARQ process as a commonly available resource in every P-HARQ process. If the number of P-HARQ processes is $N_{P\text{-}HARQ}$ and the number of S-HARQ processes is $N_{S\text{-}HARQ}$, P-HARQ PN may be set to one of the values 0 to NP-HARQ-1, and S-HARQ PN may be set to one of the values 0 to $N_{S\text{-}HARQ}$-1. A total number of HARQ processes, which may occur, is $N_{P\text{-}HARQ}+N_{S\text{-}HARQ}$.

According to a shared S-HARQ process operation scheme, a HARQ process of a PTB is identified by a P-HARQ PN, and a HARQ process of a STB is identified by a S-HARQ PN. That is, a HARQ process of a STB is identified by a S-HARQ PN, irrespective of a P-HARQ PN. In other words, in the case of a shared S-HARQ process operation scheme, a HARQ process of a STB is not subject to a HARQ process of a PTB but is operated independently. A PTB is always allocated to a P-HARQ process, and a STB is always allocated to a S-HARQ process. Each S-HARQ process cannot be transmitted together with any P-HARQ process. If a P-HARQ process and a S-HARQ process are expressed by one unique HARQ process number, a P-HARQ PN may be specified by one of the values 0 to $N_{P\text{-}HARQ}$-1, and a S-HARQ PN may be specified by one of the values $N_{P\text{-}HARQ}$ to $N_{P\text{-}HARQ}+N_{S\text{-}HARQ}$-1.

Figure 26:
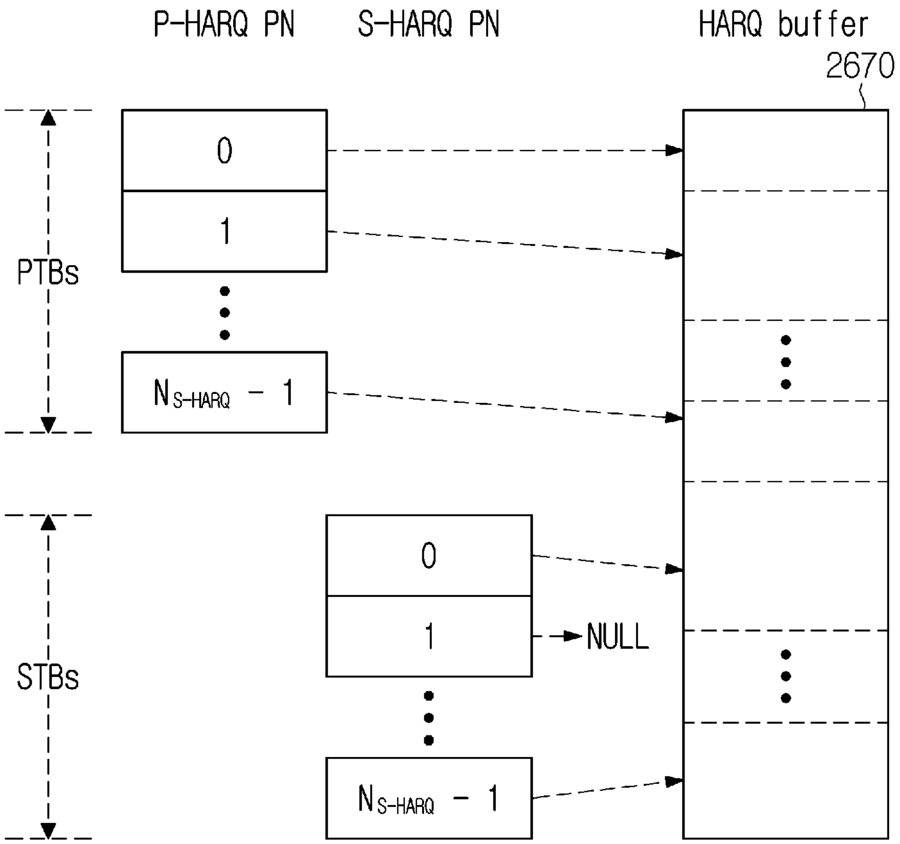
FIG. 26 illustrates an example of buffer allocation based on a shared S-HARQ process operation scheme in a wireless communication system according to an embodiment of the present disclosure.

FIG. 26 illustrates an example of buffer allocation based on a shared S-HARQ process operation scheme in a wireless communication system according to an embodiment of the present disclosure. FIG. 26 is an example of a shared S-HARQ process operation scheme, exemplifying a relationship among a PTB, a STB, a P-HARQ PN, a S-HARQ PN, and a HARQ buffer (e.g., circular buffer of a transmitter, soft buffer of a receiver).

Referring to FIG. 26, all the HARQ buffers 2670 may be dynamically managed according to a data size and a code rate which are transmitted through each P-HARQ process and each S-HARQ process. As a PTB transmitted through a P-HARQ process and a size and a code rate of a STB transmitted through a S-HARQ process are variable, the sizes of regions allocated to each HARQ process may be dynamically different. In a shared S-HARQ process operation scheme, a S-HARQ process is not subject to a P-HARQ process, scheduling flexibility is higher than in a dedicated S-HARQ process operation scheme.

Figure 27:
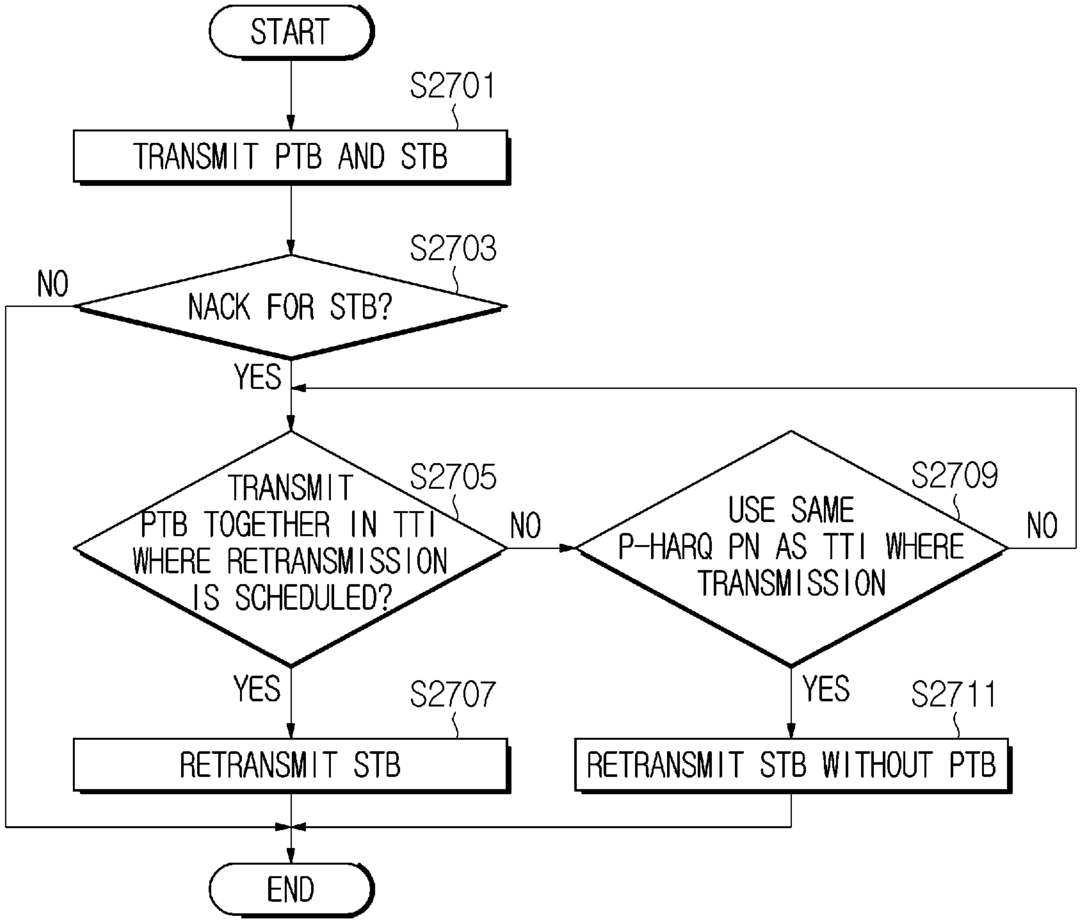
FIG. 27 illustrates an example of a procedure of retransmitting a STB based on a shared S-HARQ process operation scheme in a wireless communication system according to an embodiment of the present disclosure.

FIG. 27 illustrates an example of a procedure of retransmitting a STB based on a shared S-HARQ process operation scheme in a wireless communication system according to an embodiment of the present disclosure. FIG. 27 exemplifies a method performed by a device transmitting data, and an operating subject is referred to as 'device'. The device may be understood as a base station in downlink communication and a terminal in uplink communication.

Referring to FIG. 27, at step S2701, a device transmits a PTB and a STB. If the device is a base station, the device may transmit a DCI and transmit a PTB and a STB through a resource indicated by the DCI. If the device is a terminal, the terminal may receive a DCI and transmit a PTB and a STB through a resource indicated by the DCI.

At step S2703, the device checks whether a NACK occurs for a STB. That is, the device checks whether decoding of the STB fails in a counterpart device, and whether retransmission of the STB is requested. Herein, the occurrence of the NACK may be identified by explicit signaling or be determined based on no ACK being received.

At step S2705, the device identifies whether a PTB is transmitted together in a TTI where retransmission is scheduled. That is, the device determines, based on a scheduling result, whether there is a PTB which is transmitted together during retransmission of a STB for which the retransmission is required. This is because, in the case of a shared S-HARQ process operation scheme, when a PTB is transmitted together, a STB may be retransmitted irrespective of a P-HARQ PN.

When a PTB is transmitted together at a retransmission time of a STB, at step S2707, the device retransmits the STB. That is, the device may retransmit the STB, irrespective of a value of a P-HARQ PN in a TTI where retransmission is performed.

If a PTB is not transmitted together at a retransmission time of a STB, in other words, if the PTB is not transmitted together in a TTI where the STB is retransmitted, at step S2709, the device identifies whether a same P-HARQ PN as that of a TTI where transmission is failed is being used. This is because, in the case of a shared S-HARQ process operation scheme, if a PTB is not transmitted together, retransmission of a STB is permitted only in a TTI where a same P-HARQ PN as a P-HARQ PN of a latest transmission is used. When a PTB is not transmitted together, the device returns to step S2705 and reschedules retransmission of the STB.

On the other hand, when a PTB is transmitted together, at step S2711, the device retransmits a STB without a PTB. That is, in case a PTB is not transmitted together, since it satisfies the rule that retransmission of a STB is permitted only in a TTI where a same P-HARQ PN as a P-HARQ PN of a latest transmission is applied, the device may retransmit the STB without the PTB.

Figure 28:
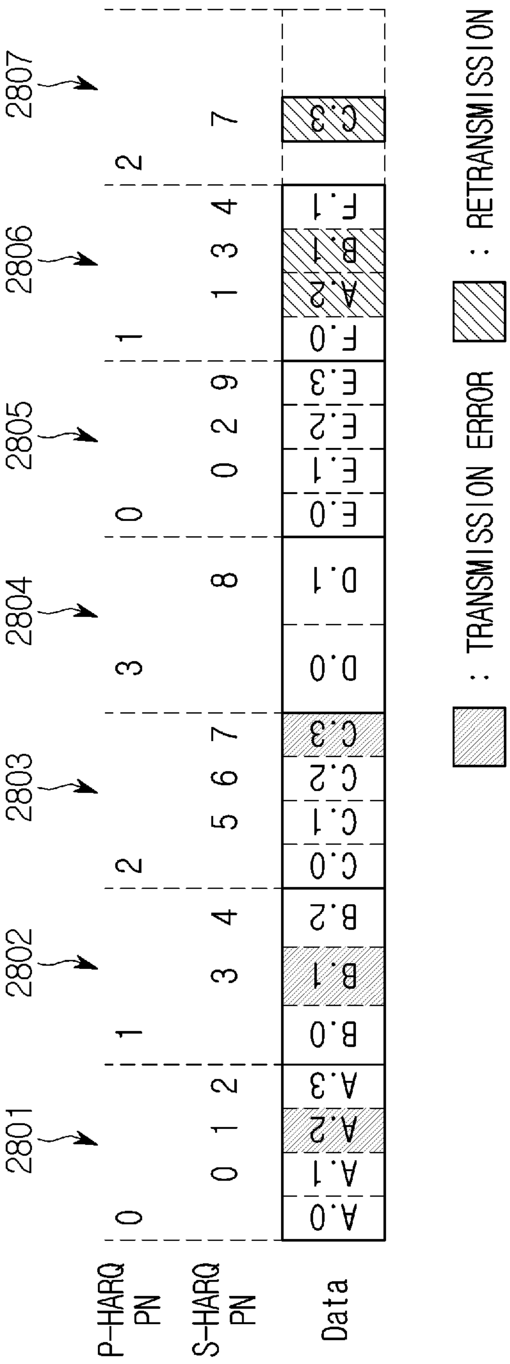
FIG. 28 illustrates an example of STB retransmission based on a shared S-HARQ process operation scheme in a wireless communication system according to an embodiment of the present disclosure.

FIG. 28 illustrates an example of STB retransmission based on a shared S-HARQ process operation scheme in a wireless communication system according to an embodiment of the present disclosure. FIG. 28 exemplifies a case where retransmission of a STB occurs in a shared S-HARQ process operation scheme in which $N_{P\text{-}HARQ}$ is 4 and $N_{S\text{-}HARQ}$ is 12. Specifically, FIG. 28 exemplifies a case in which retransmission data of a plurality of S-HARQ processes, for which initial transmission is performed together with different P-HARQ processes, is retransmitted together with a single P-HARQ process. In FIG. 28, a HARQ RTT is 4, A.0, B.0, C.0, D.0, E.0, and F.0 are PTBs, and the remaining is a STB.

Referring to FIG. 28, A.2 transmitted in a first TTI 2801, B.1 transmitted in a second TTI 2802, and C.3 transmitted in a third TTI 2803 undergo a transmission error. Accordingly, A.2, B.1, and C.3 are retransmitted. After initial transmission of A.2, a fifth TTI 2805 is the earliest one among TTIs with a P-HARQ PN of 0. However, if the priority of E.0 to E.3 is higher than retransmission of A.2, E.0 to E.3 are first transmitted in the fifth TTI 2805, and A.2 may be retransmitted together with B.1 and F.1 in a sixth TTI 2806 with a P-HARQ PN of 1. As shown in FIG. 28, according to a shared S-HARQ process operation scheme, when a retransmitted STB is transmitted together with a PTB, a P-HARQ PN at the retransmission does not have to be the same as a P-HARQ PN of initial transmission.

In the case of FIG. 28, C.3 is not retransmitted together with new data but is retransmitted alone without any PTB. In case a STB is retransmitted alone without any PTB, the STB is retransmitted in a TTI with a same P-HARQ PN as that of latest transmission with a PTB. Accordingly, C.3 is retransmitted in a seventh TTI 2807 with a P-HARQ PN of '2'.

As described above, retransmission of a STB may be performed in consideration of a P-HARQ PN. In addition, when retransmission is performed, a rule is needed to configure a HARQ-related parameter included in a DCI. Hereinafter, the present disclosure will describe various embodiments about configurations of NDI and CBGTI included in a DCI.

According to various embodiments, NDI and CBGTI included in a DCI may be differently configured between a case where retransmission is performed together with new data (hereinafter 'first case') and a case where retransmission alone is performed without new data (hereinafter 'second case'). A configuration example of NDI and CBGTI for the first case and the second case may be defined as shown in Table 1 below.

TABLE 2

| | First case (Initial transmission and retransmission) | Second case (Retransmission without initial transmission) |
|---|---|---|
| PTB NDI of DCI | 1 (New transmission) | 0 (Retransmission) |
| CBGTI #0 of DCI | 1 (PTB transmitted) | 0 (PTB not transmitted) |
| CBGTI #1~#G-1 of DCI | Every CBGTI corresponding to every transmitted STB is set to 1 | CBGTI used at a latest time when retransmission STBs are transmitted together with a PTB is set to 1 |

TABLE 2-continued

| | First case (Initial transmission and retransmission) | Second case (Retransmission without initial transmission) |
|---|---|---|
| Whether PTB is transmitted | Transmitted | Not transmitted |

Referring to Table 2, a PTB NDI of a DCI is set to 1(=initial transmission), when at least one of a PTB including new data or a STB is transmitted, and is set to 0(=retransmission) when a retransmission STB alone is transmitted. In the first case, CBGTI #0 indicating whether a PTB is transmitted is set to 1, and a PTB including transmission control information of STBs is transmitted. In the second case, CBGTI #0 indicating whether a PTB is transmitted is set to 0, and no PTB is transmitted. In the second case where no PTB is transmitted, at least one PTB retransmitted is indicated by CBGTI. At least one STB retransmitted is indicated by the same CBGTI as CBGTI used at a latest time when it is transmitted together with a PTB.

Figure 29A:
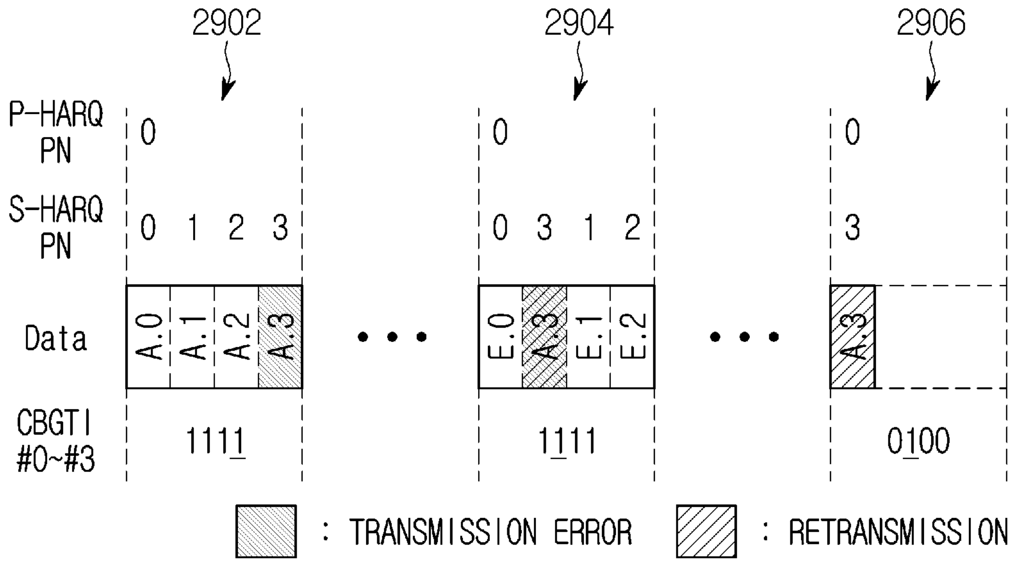
FIG. 29A to FIG. 29C illustrate examples of code block group transmission information (CBGTI) according to retransmission in a wireless communication system according to an embodiment of the present disclosure.
Figure 29B:
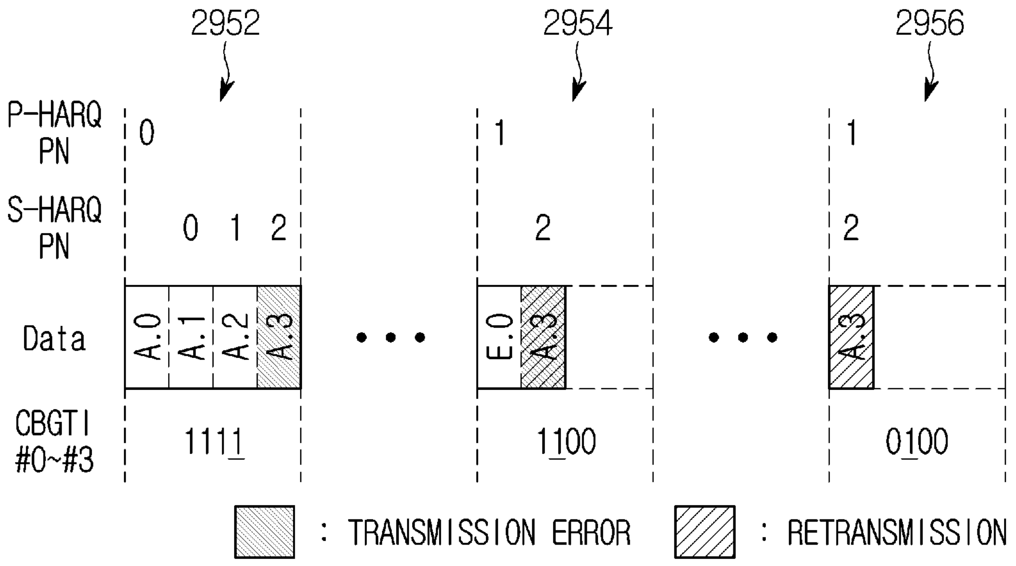
Figure 29C:
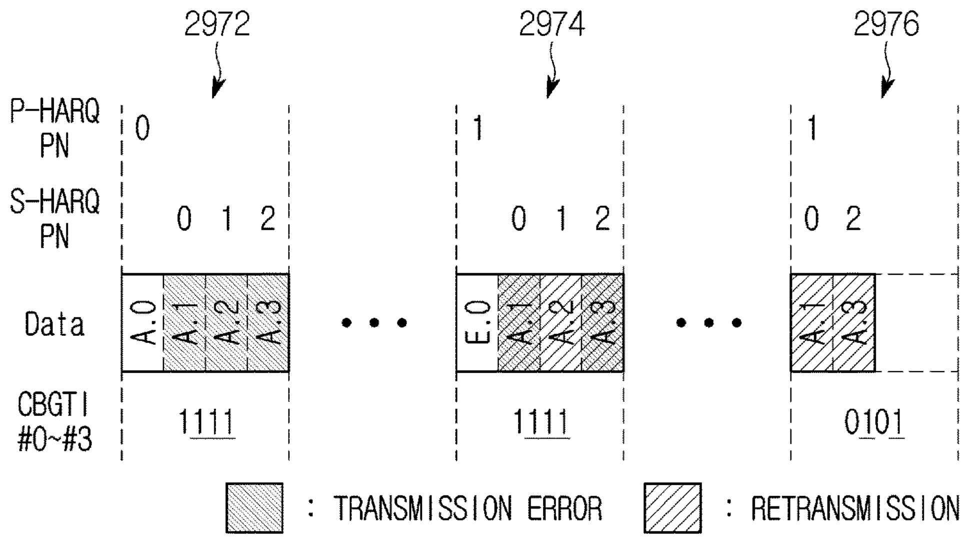

FIG. 29A to FIG. 29C illustrate examples of code block group transmission information (CBGTI) according to retransmission in a wireless communication system according to an embodiment of the present disclosure. FIG. 29A exemplifies a case of a dedicated S-HARQ process operation scheme, and FIG. 29B and FIG. 29C exemplify a case of a shared S-HARQ process operation scheme. In FIG. 29A to FIG. 29C, it is assumed that a difference between a first TTI and a second TTI is $d_1$ and a difference between the second TTI and a third TTI is $d_2$.

In FIGS. 29A, A.0 and E.0 are PTBs, the remaining ones are STBs, and a maximum number G of CBGs is 4. Referring to FIG. 29A, A.0, A.1, A.2, and A.3 are transmitted in a n-th TTI 2902, and A.3 undergoes a transmission error. Accordingly, first retransmission and second retransmission are performed in a $n+d_1$-th TTI 2904 and a $n+d_1+d_2$-th TTI 2906 which have a same P-HARQ PN. As A.3 is in the fourth place, CBGTI #3, a bit of position #3, indicates transmission of A.3. In the $n+d_1$-th TTI 2904, A.3 is in the second place, and thus CBGTI #1, a bit of position #1, indicates transmission of A.3. In the $n+d_1+d_2$-th TTI 2906, A.3 is transmitted alone without new data, and CBGTI #1 indicates transmission of A.3. That is, in the second retransmission of A.3, which has underwent error in the initial transmission and the first retransmission, CBGTI #1, which was used in the first retransmission, not CBGTI #3 used in the initial transmission, is used in the second retransmission.

In FIG. 29B, A.0 and E.0 are PTBs, the remaining ones are STBs, and a maximum number G of CBGs is 4. Referring to FIG. 29B, A.0, A.1, A.2, and A.3 are transmitted in a n-th TTI 2952, and A.3 undergoes a transmission error. Accordingly, first retransmission and second retransmission are performed in a $n+d_1$-th TTI 2954 and a $n+d_1+d_2$-th TTI 2956. In the case of retransmission in the $n+d_1$-th TTI 2954, since a PTB is transmitted together, a P-HARQ PN may be different from that of initial transmission, and CBGTI #1, a bit of position #1 different from initial transmission, may indicate transmission of A.3. However, the second retransmission without PTB is performed in the $n+d_1+d_2$-th TTI 2956 where a same P-HARQ PN as that of the $n+d_1$-th TTI 2954, in which a PTB is transmitted together for the last time, is used, and a same CBGT bit as the $n+d_1$-th TTI 2954 indicates transmission of A.3. Accordingly, the second retransmission of A.3 is performed in the $n+d_1+d_2$-th TTI 2956 with a P-HARQ PN of '1', and transmission of A.3 is indicated by CBGTI #1 used for the first retransmission, not by CBGTI #3 that is a bit of position #3 used for the initial transmission.

In FIG. 29C, A.0 and E.0 are PTBs, the remaining ones are STBs, and a maximum number G of CBGs is 4. Referring to FIG. 29C, A.0, A.1, A.2 and A.3 are transmitted in a n-th TTI 2972, and A.1, A.2, and A.3 undergo a transmission error. Accordingly, first retransmission for A.1, A.2, and A.3 is performed in a $n+d_1$-th TTI 2974, and second retransmission for A.1 and A.3 is performed in a $n+d_1+d_2$-th TTI 2976. The second retransmission performed without PTB is performed in the $n+d_1+d_2$-th TTI 2976 that uses a same P-HARQ PN as that of the $n+d_1$-th TTI 2974 in which a PTB is transmitted together for the last time, and the same CBGTI bits as those of the $n+d_1$-th 2974 indicate transmission of A.1 and A.3. Accordingly, the second retransmission of A.1 and A.3 is performed in the $n+d_1+d_2$-th TTI 2976 with a P-HARQ PN of '1', transmission of A.1 is indicated by CBGTI #1 used for the first retransmission, and transmission of A.3 is indicated by CBGTI #3 used for the first retransmission.

Figure 30:
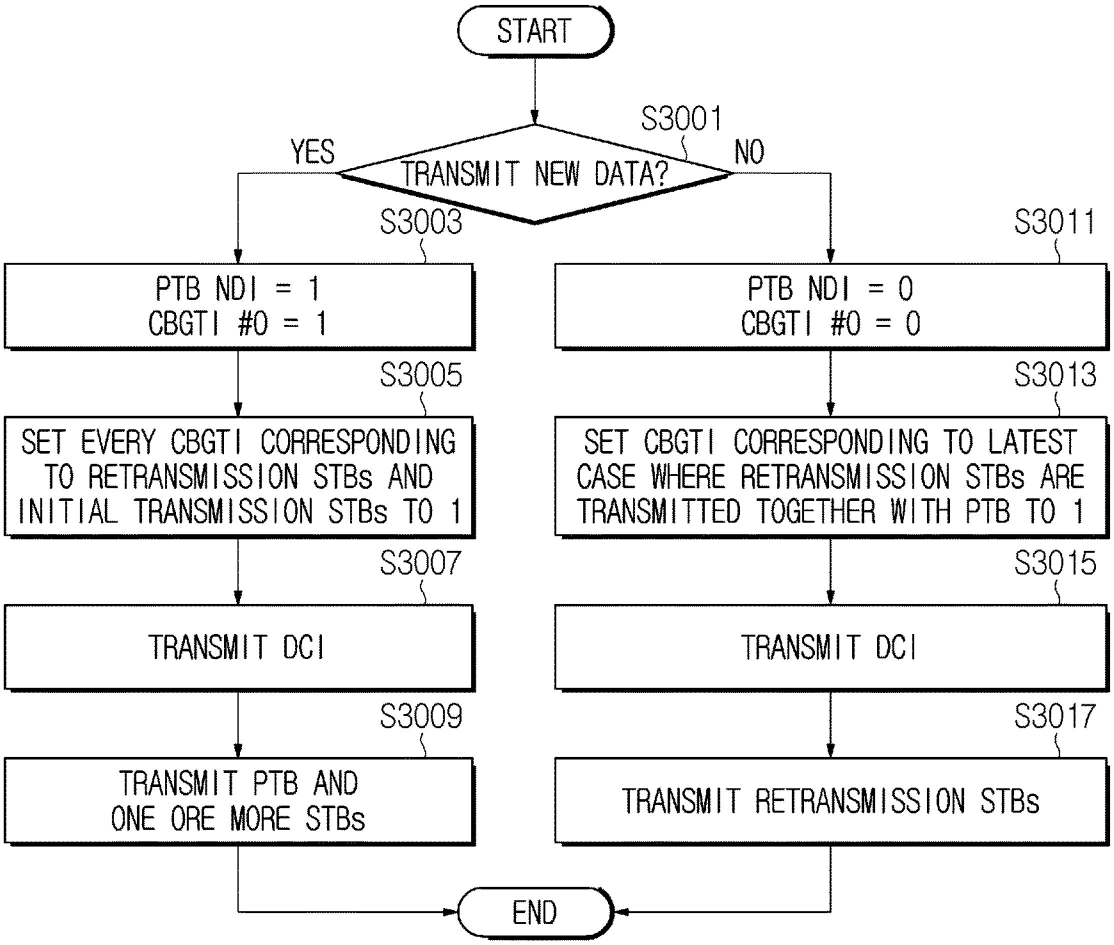
FIG. 30 illustrates an example of a procedure of retransmitting a STB in a wireless communication system according to an embodiment of the present disclosure.

FIG. 30 illustrates an example of a procedure of retransmitting a STB in a wireless communication system according to an embodiment of the present disclosure. FIG. 30 exemplifies a method performed by a base station.

Referring to FIG. 30, at step S3001, a base station checks whether new data is transmitted. That is, before transmitting a DCI and at least one TB, the base station determines whether there is new data, that is, initial transmission data, in order to set HARQ information in the DCI. Herein, the presence of new data means that there is a PTB that is initially transmitted.

When the new data is transmitted, at step S3003, the base station sets a PTB NDI to '1' and sets CBGTI #0 to '1'. Herein, '1' is an example value meaning positive, and according to another embodiment, '0' may be used for the positive meaning. At step S3005, the base station sets all bits in CBGTI corresponding to retransmission STBs and initial transmission STBs to '1'. At step S3007, the base station transmits the DCI. At step S3009, the base station transmits a PTB and at least one STB. That is, the base station transmits a PTB and at least one STB through a resource indicated by the DCI.

If new data is not transmitted, that is, if at least one retransmission STB alone is transmitted, at step S3011, the base station sets a PTB NDI to '0' and CBGTI #0 to '0'. Herein, '0' is an example value meaning negative, and according to another embodiment, '1' may be used for the negative meaning. At step S3013, the base station sets a CBGTI bit used when retransmission STBs are transmitted together with a PTB for the last time to '1'. At step S3015, the base station transmits a DCI. At step S3017, the base station transmits at least one retransmission STB. That is, the base station transmits at least one retransmission STB through a resource indicated by the DCI.

Examples of the above-described proposed methods may be included as one of the implementation methods of the present disclosure and thus may be regarded as kinds of proposed methods. In addition, the above-described proposed methods may be independently implemented or some of the proposed methods may be combined (or merged). The rule may be defined such that the base station informs the UE of information on whether to apply the proposed methods (or information on the rules of the proposed methods) through a predefined signal (e.g., a physical layer signal or a higher layer signal).

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

Industrial Availability

The embodiments of the present disclosure are applicable to various radio access systems. Examples of the various radio access systems include a 3rd generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method performed by a base station in wireless communication system, the method comprising:

transmitting a first downlink control signal (DCI), wherein the first DCI includes at least one of a first hybrid automatic repeat request (HARQ) process number, a first new data indicator (NDI), and a first redundancy version (RV) for a first type transport block; and transmitting the first type transport block and a second type transport block through a resource within a first transmission time interval (TTI) indicated by the first DCI, wherein the first type transport block includes at least one of a second HARQ process number, a second NDI, and a second RV for the second type transport block, wherein a HARQ process of the second type transport block is identified by the second HARQ process number, irrespective of the first HARQ process number;

receiving a negative-acknowledge (NACK) for the second type transport block;

transmitting a second DCI including a third HARQ process number; and retransmitting the second type transport block through resources within a second TTI indicated by the second DCI without the first type transport block, and wherein a value of the third HARQ process number is identical with a value of the first HARQ process number.

2. The method of claim 1, wherein the first type transport block further includes at least one of modulation order information and code rate information of the second type transport block.

3. The method of claim 1, wherein the second TTI is one of TTIs associated with a HARQ process number which is set to a same value as the first HARQ process number.

4. The method of claim 1, wherein the first DCI further include first code block group transmission information (CBGTI) notifying transmission of the first type transport block and the second type transport block, wherein, among bits in the first CBGTI, a bit of a first position corresponding to the first type transport block and a bit of a second position corresponding to the second type transport block are set to a positive value, and wherein a bit of the second position of second CBGTI in second DCI associated with the second TTI indicates transmission of the retransmitted second type transport block.

5. A method performed by a User Equipment (UE) in wireless communication system, the method comprising:

receiving a first downlink control signal (DCI), wherein the first DCI includes at least one of a first hybrid automatic repeat request (HARQ) process number, a first new data indicator (NDI), and a first redundancy version (RV) for a first type transport block; and receiving the first type transport block and a second type transport block through a resource within a first transmission time interval (TTI) indicated by the first DCI, wherein the first type transport block includes at least one of a second HARQ process number, a second NDI, and a second RV for the second type transport block, wherein a HARQ process of the second type transport block is identified by the second HARQ process number, irrespective of the first HARQ process number;

transmitting a negative-acknowledge (NACK) for the second type transport block;

receiving a second DCI including a third HARQ process number; and receiving the second type transport block through resources within a second TTI indicated by the second DCI without the first type transport block, and wherein a value of the third HARQ process number is identical with a value of the first HARQ process number.

6. The method of claim 5, wherein the first DCI further include first code block group transmission information (CBGTI) notifying transmission of the first type transport block and the second type transport block, wherein, among bits in the first CBGTI, a bit of a first position corresponding to the first type transport block and a bit of a second position corresponding to the second type transport block are set to a positive value, and wherein a bit of the second position of second CBGTI in second DCI associated with the second TTI indicates transmission of the second type transport block received through the resources within the second TTI.

7. A base station in a wireless communication system, the base station comprising:

at least one transceiver:

at least one processor; and at least one computer memory operably connectable to the at least one processor and storing instructions that, when executed, cause the at least one processor to perform operations comprising:

transmitting, through the at least one transceiver, a first downlink control signal (DCI), wherein the first DCI includes at least one of a first hybrid automatic repeat request (HARQ) process number, a first new data indicator (NDI), and a first redundancy version (RV) for a first type transport block; and transmitting, through the at least one transceiver, the first type transport block and a second type transport block through resources within a first transmission time interval (TTI) indicated by the first DCI, wherein the first type transport block includes at least one of a second HARQ process number, a second NDI, and a second RV for the second type transport block, wherein a HARQ process of the second type transport block is identified by the second HARQ process number, irrespective of the first HARQ process number;

receiving, through the at least one transceiver, a negative-acknowledge (NACK) for the second type transport block;

transmitting, through the at least one transceiver, a second DCI including a third HARQ process number; and retransmitting, through the at least one transceiver, the second type transport block through resources within a second TTI indicated by the second DCI without the first type transport block, and wherein a value of the third HARQ process number is identical with a value of the first HARQ process number.

* * * * *